United States Patent
Krishan et al.

(10) Patent No.: US 12,413,474 B2
(45) Date of Patent: Sep. 9, 2025

(54) POLICY TAGS FOR 5G NETWORK FUNCTION INCONSISTENCY DETECTION AND RECONCILIATION

(71) Applicant: Oracle International Corporation, Redwood City, CA (US)

(72) Inventors: Rajiv Krishan, Cary, NC (US); Tarek Assali, Boston, MA (US); Robert L. Wallace, Apex, NC (US)

(73) Assignee: Oracle International Corporation, Redwood City, CA (US)

( * ) Notice: Subject to any disclaimer, the term of this patent is extended or adjusted under 35 U.S.C. 154(b) by 29 days.

(21) Appl. No.: 18/441,134

(22) Filed: Feb. 14, 2024

(65) Prior Publication Data
US 2025/0260619 A1    Aug. 14, 2025

(51) Int. Cl.
*G06F 15/173*    (2006.01)
*H04L 41/0894*    (2022.01)
*H04L 41/12*    (2022.01)

(52) U.S. Cl.
CPC .......... *H04L 41/0894* (2022.05); *H04L 41/12* (2013.01)

(58) Field of Classification Search
CPC ............................ H04L 41/0894; H04L 41/12
See application file for complete search history.

(56) References Cited

U.S. PATENT DOCUMENTS

2003/0067921 A1* 4/2003 Sivalingham ......... H04W 12/06
370/394

OTHER PUBLICATIONS

Use entity tags for optimistic concurrency control [online], Google Cloud, 2024 [retrieved on Oct. 15, 2024]. Retrieved from the Internet: <https://cloud.google.com/secret-manager/docs/etags>, 6 pages.
Oracle Fusion Middleware Kodo Developers Guide for JPA/JDO, 11g Release 1(10.3.6), 15.10 Version: Mapping Metadata [online], Oracle Corporation [retrieved on Oct. 15, 2024]. <https://docs.oracle.com/cd/E23943_01/apirefs.1111/e13946/jdo_overview_mapping_version.html>, 5 pages.

* cited by examiner

*Primary Examiner* — Joseph R Maniwang

(57) ABSTRACT

Systems and methods for providing policy tags to detect and reconcile inconsistencies between a network function (NF) producer and an NF consumer are provided herein. In an example, a system includes instructions for a NF producer to establish a first state with an NF consumer, where the NF producer and the NF consumer are in a 5G network, generate a first policy tag corresponding to the first state, and store the first policy tag as the latest stored policy tag. The latest policy tag is then transmitted in subsequent signaling from/ to the NF consumer and signaling including the latest received policy tag is received from the NF consumer. A validation process is then performed with the latest received policy tag from the NF consumer and the communication is processed based on the validation process of the received policy tag.

20 Claims, 11 Drawing Sheets

POLICY TAGS FOR 5G NETWORK FUNCTION INCONSISTENCY DETECTION AND RECONCILIATION

TECHNICAL FIELD

Various embodiments of the present technology generally relate to network function communication within 5G networks. More specifically, embodiments of the present technology relate to systems and methods for providing detecting an inconsistency in shared stated data between two or more network functions (NFs) within a 5G network and reconciling the inconsistency.

BACKGROUND

In the realm of 5G networks, N7 policy evaluation and decision at the Policy Control Function (PCF) play a pivotal role in ensuring efficient and dynamic network management. N7 represents a reference point in the 5G architecture, specifically designed for communication between the PCF and the Session Management Function (SMF). The PCF is responsible for enforcing policies related to quality of service, network slicing, and user authentication. N7 policy evaluation involves the examination of these policies in real-time, considering factors such as network congestion, user demands, and application requirements. The PCF's decision-making process at the N7 level involves dynamically adapting policies to optimize resource allocation, enhance user experience, and maintain the overall integrity of the 5G network. This capability is crucial for delivering on the promises of low-latency, high-speed connectivity, and personalized services in the era of 5G communications. As technology continues to evolve, the N7 policy evaluation and decision mechanisms at the PCF will remain instrumental in shaping the efficiency and performance of 5G networks.

Currently, to aid in efficient session establishment within the 5G network, the PCF interacts with the SMF. Interactions between the SMF and the PCF are pivotal for orchestrating seamless and optimized user experiences. The SMF takes the lead in session management, handling tasks such as authentication, mobility management, and IP address assignment. Concurrently, the SMF collaborates closely with the PCF to leverage policy information that shapes the characteristics of the user session. The PCF, as the key component for policy control, provides the SMF with real-time policy decisions based on factors like Quality of Service (QOS) requirements, network conditions, and service-level agreements. This interaction ensures that the policies governing aspects such as data prioritization, bandwidth allocation, and application-specific treatment are effectively enforced throughout the user session. Through this dynamic collaboration, the SMF and PCF collectively contribute to the delivery of enhanced 5G services, allowing for adaptive, policy-driven control over network resources to meet the diverse needs of users and applications.

Disruptions, however, may arise leading to the PCF and SMF operating at inconsistent states. As those skilled in the art readily appreciate, operating at an inconsistent state between the PCF and the SMF may lead to disruptions in network performance and user experience. An inconsistent state may result from communication or signaling delays or failures between these key network functions, leading to misalignments in policy enforcement and session management. This miscoordination can trigger discrepancies in QoS, hinder the proper implementation of network slicing, and impact the allocation of resources. Users may experience fluctuations in data speeds, dropped connections, denials, or delays in accessing services. It is imperative for 5G network operators to address and mitigate these issues promptly, as a harmonized and synchronized operation between the PCF and SMF is essential for delivering the promised benefits of 5G, such as low latency, high data rates, and efficient resource utilization.

Currently techniques and systems, however, only allow for reactive detection of inconsistencies between the PCF and SMF. As such, inconsistencies are only detected after they have already occurred and thus often lead to emerging issues. Accordingly, there exists a need for improved signaling mechanisms, such as the policy tags and related functions provided herein, that can provide proactive inconsistency detection and reconciliation between network functions (NFs) within the 5G network. In other words, the policy tags and related functions provided herein can eliminate implicit reactive detection and provide proactive inconsistency detection and reconciliation in many cases.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing policy tags, and their related functions, to detect and reconcile network function inconsistencies. In particular, policy tags are provided herein for detecting inconsistencies between a NF producer and a NF consumer, such as between the PCF and the SMF. To detect inconsistencies, a policy tag is generated by a NF producer to indicate a current state of operation when communicating with a NF consumer. When the NF consumer receives a policy tag from the NF producer, the NF consumer stores the policy tag. In subsequent communications between the NF producer and the NF consumer, a most recent policy tag is identified and provided to the corresponding NF. For example, when sending an update request to a PCF, the SMF may include a most recent policy tag to indicate its current state. When the PCF receives the update request, the PCF identifies the most recent policy tag and determines its own most recent policy tag (e.g., the policy tag the PCF stored prior to receiving the update request). The PCF then compares the two policy tags to determine if the two NFs are operating according to consistent states.

If a NF producer determines that the two NFs are operating according to a consistent state, then the NF producer continues with the update request. If the NF producer, however, determines that the two NFs are operating according to inconsistent states, then the NF producer determines an inconsistency. As will be described in greater detail below, when the NF producer determines an inconsistency, the NF producer determines an appropriate reconciliation process based on the type of inconsistency and current operational configuration of the NFs. Once the appropriate reconciliation process is identified, the NF producer performs the identified reconciliation process and the two NFs are returned to operating on consistent states.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
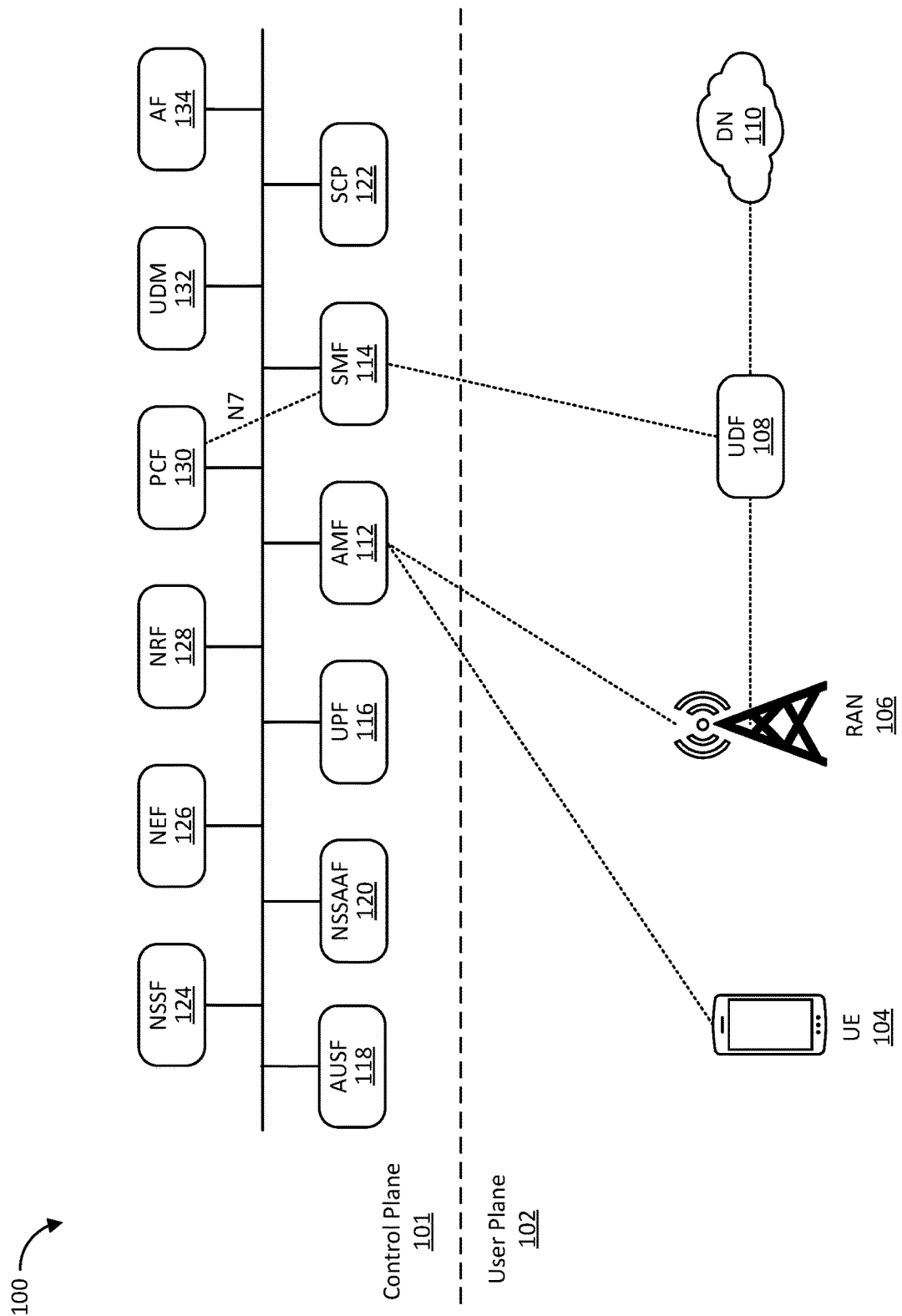
FIG. 1 illustrates an example operational environment for a 5G network in which one or more features of a policy tag process can be implemented, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The advent of 5G technology represents a paradigm shift in the realm of telecommunications, promising unprecedented advancements in connectivity, speed, and reliability. Unlike its predecessors, 5G is characterized not only by enhanced data rates but also by low latency, massive device connectivity, and the ability to support diverse applications, ranging from augmented reality to the Internet of Things (IoT). At the heart of the 5G architecture is the Service-Based Architecture (SBA), which fundamentally transforms the way network functions operate. In the 5G ecosystem, various network functions (NFs) are modularized, each serving specific roles in delivering end-to-end services. These NFs, including the Session Management Function (SMF), Policy Control Function (PCF), User Plane Function (UPF), and others, are interconnected through standardized interfaces, allowing for a more dynamic, scalable, and flexible network. The SBA enables these NFs to act as producers and consumers of services, fostering a modular and interoperable environment where services are orchestrated seamlessly to meet the diverse needs of users and applications. This architectural evolution is pivotal in realizing the full potential of 5G networks and accommodating the demands of an increasingly connected and data-driven world.

However, despite the promise of 5G's advanced capabilities, the presence of inconsistencies between NFs can significantly undermine the performance and reliability of the network. In a 5G ecosystem where NFs operate collaboratively, any misalignment or inconsistency in communication between these functions may result in suboptimal service delivery. Issues such as misconfigured policies, conflicting QoS parameters, or delays in data transmission between functions can lead to service disruptions, degraded user experiences, and compromised network efficiency. For instance, if the SMF fails to synchronize seamlessly with the PCF, it may lead to discrepancies in policy enforcement, affecting crucial aspects like traffic steering and resource allocation. The interconnected nature of these NFs demands a harmonized operation, and any inconsistencies introduce vulnerabilities that can impede the seamless connectivity and advanced functionalities promised by 5G technology.

One area in which inconsistencies adversely impact the functionality of 5G technology is communication between the SMF and PCF. Inconsistencies between the SMF and the PCF can have profound consequences on the 5G network and a user's experience within the 5G network. For example, when SMF-PCF inconsistencies occur, critical policies governing QoS, network slicing, and user authentication may not be uniformly enforced, leading to variations in service delivery. That is, if the SMF and PCF fail to communicate seamlessly, it may result in inaccuracies in policy decisions, impacting data prioritization, bandwidth allocation, and overall traffic management. Inconsistent enforcement of policies may disrupt the promised low-latency communication, compromise user data security, and hinder the efficient utilization of network resources. Furthermore, these discrepancies can pose challenges in implementing dynamic services and adapting to changing network conditions.

Adding another layer of complexity to the challenges posed by SMF-PCF inconsistencies is the fact that the PCF, in its current design, often lacks the capability to proactively detect such inconsistencies. The PCF relies heavily on the information provided by various NFs, including the SMF, and inconsistencies may arise due to factors such as communication delays, configuration errors, or unforeseen network events. The reactive nature of inconsistency detection in the PCF can result in delayed responses to emerging issues, leaving the network vulnerable to disruptions. As a consequence, potential inconsistencies may only be identified when they manifest as operational problems or user experience issues, making it challenging to implement pre-emptive measures. Establishing mechanisms for more proactive monitoring, early detection, and automated resolution of inconsistencies between the SMF and PCF is crucial for enhancing the resilience and reliability of 5G networks in the face of dynamic and evolving communication environments.

To allow for proactive inconsistency detection between the PCF and SMF, example policy tags and their related functions are provided herein. The policy tags are generated by a NF producer to indicate the current state of operation. A state of operation for a network function, such as the PCF or SMF, encompasses the specific configuration, resource allocation, and rule sets that dictate its current mode of functionality within the broader network ecosystem. Thus, when communicating with a NF consumer, a NF producer generates and provides a policy tag to indicate the NF producer's current operating state. For example, the NF producer may receive a request from an NF consumer to establish a session. The session request may include state data for the session. Responsive to receiving the session request, the NF producer generates a policy tag for the session and stores the policy tag along with the state data for the session. The NF producer also transmits the policy tag to the NF consumer for the NF consumer to store and use in future communications. Thus, when the NF consumer communicates with the NF producer at a future time, the NF consumer provides the stored policy tag along with its request or response, thereby providing information as to its current operating state.

Carrying forward, whenever there is an update in state by either the NF consumer or the NF producer, a new policy tag is generated and used for subsequent communications. In this manner, each NF can provide information on its current state to its NF counterpart, thereby allowing for identification of inconsistencies. By identifying inconsistencies before implementing a new operating state, one or more reconciliation methods can be performed to rectify the inconsistency. For example, when the NF producer receives the policy tag from the NF consumer, the NF producer compares that policy tag against a respective stored policy tag. If the received policy tag matches the respective stored policy tag, the NF producer validates that both NFs are operating at the same state. If, however, the NF producer determines that the policy tag received from the NF consumer does not match the respective stored policy tag, then the NF producer identifies the inconsistency between the two NFs and can determine an appropriate reconciliation method. A reconciliation method may be determined by the NF producer based on a type of conflict and operation configuration. Example reconciliation methods include last-update-wins, termination of the session and re-establishment of a new session, merging of the session records, re-synchronization of session states, and rebuilding of the session state. Each of these types or reconciliation methods will be described in greater detail below.

The policy tags and related functions provided herein allow for timely identification of inconsistencies between NFs. Timely identification of inconsistencies between these functions is essential to prevent potential disruptions, enhance network reliability, and optimize resource utilization. The proactive detection provided by policy tags allows network operators to address discrepancies before they escalate into critical issues, ensuring that policies are applied consistently across sessions. As such, policy tags and their related functions not only safeguard the integrity of service delivery but also promote the effective implementation of QoS parameters, enabling 5G networks to meet the diverse and evolving needs of users and applications. In summary, policy tags provide for proactive detection and reconciliation of inconsistencies between PCF and SMF, thereby maintaining a resilient and high-performing 5G network.

It should be appreciated that while the following discussion involves the NF producer and NF consumer being one of the PCF and the SMF, the policy tag and its related functions are equally applicable for other NFs. However, for ease of discussion the example policy tags provided herein are described in the context of the N7 level communication between the PCF and the SMF.

Turning now to the Figures, FIG. 1 illustrates an example operational environment for a 5G network 100 in which one or more features of a policy tag process can be implemented, according to an embodiment herein. The example 5G network 100 is a 5G core (5GC) cellular network implementing 3GPP (3rd Generation Partnership Project) communication standards, although the present disclosure may apply to other communication networks.

The 5G network 100, its components, and their subcomponents may be implemented via computers, servers, hardware and software modules, or other system components. The components of the 5G network 100 and its subcomponents, or the physical devices implementing them, may be co-located, remotely distributed, or any combination thereof. The elements of 5G network 100 may include components hosted or situated in the cloud and implemented as software modules potentially distributed across one or more server devices or other physical components.

The 5G network 100 is divided into two fundamental planes: a control plane 101 and a user plane 102, each serving distinct yet interdependent roles. The control plane 101 is responsible for managing the signaling and control information necessary to establish, modify, and terminate communication sessions. The control plane 101 handles tasks such as authentication, policy enforcement, and mobility management. As such, the control plane 101 is crucial for orchestrating and controlling the NFs, ensuring efficient and secure connectivity. On the other hand, the user plane 102 deals with the actual data transmission—the movement of user data between devices and applications. It is optimized for high-throughput, low-latency data delivery, and is designed to efficiently transport user traffic. The separation of the control plane 101 and user plane 102 in the 5G network 100 enhances scalability, flexibility, and enables network slicing, allowing tailored configurations to meet diverse service requirements. Together, these planes 101 and 102 form a cohesive architecture that empowers the 5G network 100 to deliver unprecedented speed, reliability, and versatility for a wide array of applications and services.

As noted above, the user plane 102 of the 5G network 100 operates in tandem with the control plane 101 to deliver efficient and seamless data transmission. For example, as illustrated, when a User Equipment (UE) 104, which could be a smartphone or any other device, initiates a communication the user plane 102 handles the actual user data traffic. When the UE 104 initiates communication, the Radio Access Network (RAN) 106 comes into play, managing the wireless connection between the UE 104 and the network 100, in particular the UE 104 and the Access and Mobility Management Function (AMF) 112. The RAN 106 acts as the bridge between the user plane 102 and the control plane 101, facilitating the establishment of communication sessions. As data travels through the RAN 106, it encounters the User Data Function (UDF) 108, which plays a pivotal role in processing and optimizing user data. The UDF 108 is responsible for tasks such as traffic optimization, content caching, and data transformation, enhancing the efficiency of data delivery.

The UDF 108 provides the data to the Data Network (DN) 110, which could represent the broader internet or a specific network service. The DN 110 processes and delivers the user data to its intended destination, completing the journey initiated by the UE 104. The collaborative operation of the user plane 102, UE 104, RAN 106, UDF 108, and DN 110 ensures that data is transmitted reliably and efficiently, meeting the high-performance expectations of 5G networks. As those skilled in the art readily appreciate, the separation of user plane 102 and control plane 101 allows for flexible network configurations and optimizations, contributing to the enhanced capabilities of the 5G ecosystem.

As noted above, when the UE 104 initiates a communication within the 5G network 100, the AMF 112 coordinates the interaction. For example, when the UE 104 initiates communication or moves within the 5G network 100, it sends signaling messages to the AMF 112. The AMF 112 is responsible for tasks such as authentication, authorization, and mobility management. Upon receiving the signaling messages from the UE 104, the AMF 112 validates the user's identity, checks for necessary permissions, and establishes the necessary context for the session. The AMF 112 coordinates with other network functions, such as the Session Management Function (SMF) 114 and the User Plane Function (UPF) 116, to ensure the seamless setup and management of communication sessions. The interaction with the control plane 101 enables the UE 104 to access network services, adhere to established policies, and maintain continuous connectivity while benefiting from the advanced capabilities and optimizations offered by the 5G network architecture.

The control plane 101 includes example components, nodes, or NFs. As illustrated, the control plane 101 includes the AMF 112, the SMF 114, the UPF 116, an Authentication Server Function (AUSF) 118, a Network Slice-Specific Authentication and Authorization Function (NSSAAF) 120, Service Communications Proxy (SCP) 122, a Network Slice Selection Function (NSSF) 124, Network Exposure Function (NEF) 126, a Network Repository Function or NF Repository Function (NRF) 128, a Policy Control Function (PCF) 130, a Unified Data Management (UDM) 132, and an Application Function (AF) 134. The selection of NFs 112-134 depicted in the 5G network 100 is exemplary, and some of the NFs 112-134 may be excluded, or other NFs added to the collection, without departing from the scope of this disclosure. The various NFs 112-134 execute various operations to provide communication services to UEs, such as the UE 104, that connects to the 5G network 100. A network node or NF that provides service is referred to herein as a NF producer, while a network node or NF that consumes services is referred herein to as a NF consumer. A network function can be both a NF producer and a NF consumer depending on whether it is consuming or providing service.

The NFs 112-134 of the 5G network 100 exchange various communications in the course of providing network services. The communications may include messaging to establish or end secured communication channels, such as transport layer security (TLS) handshakes, as well as service-based interface (SBI) communications. As used herein, SBI is the term given to the application programming interface (API) based communication that can take place between two NFs within the 5G SBA. A given NF can utilize an API call over the SBI to invoke a particular service or service operation. Communications between NFs 112-134 may be performed over network links and communication channels of the 5G network 100 that are not explicitly depicted in FIG. 1.

When the UE 104 initiates communication within the 5G network 100, the PCF 130 and the SMF 114 work collaboratively to ensure a seamless and optimized user experience. When the UE 104 initiates a communication session, the UE 104 sends signaling messages to the SMF 114 indicating the intent to establish a communication session. The SMF 114 then engages with the PCF 130 to enforce policies relevant to the specific user, application, or service. The PCF 130 is responsible for policy decision-making and evaluates the communication request based on predetermined policies, network conditions, and user profiles. The PCF 130 communicates with the SMF 114 to convey policy decisions, which are then implemented to control aspects such as QoS, traffic steering, and resource allocation. This dynamic interaction between the PCF 130 and SMF 114 is integral to providing a tailored and efficient communication experience, ensuring that policies are applied consistently across the session, and facilitating the network's ability to adapt to varying user and application requirements in real-time.

Miscoordination between the SMF 114 and the PCF 130, however, does occur. For example, miscoordination can arise when there are disruptions in the communication and data exchange between the SMF 114 and the PCF 130. Factors such as network latency, data transmission errors, or software glitches can contribute to misalignment, leading to inconsistencies in policy decisions and session management. These disruptions can result in suboptimal QoS, inefficient resource utilization, and an overall compromise in the coherent application of policies between the PCF 130 and the SMF 114.

Figure 2:
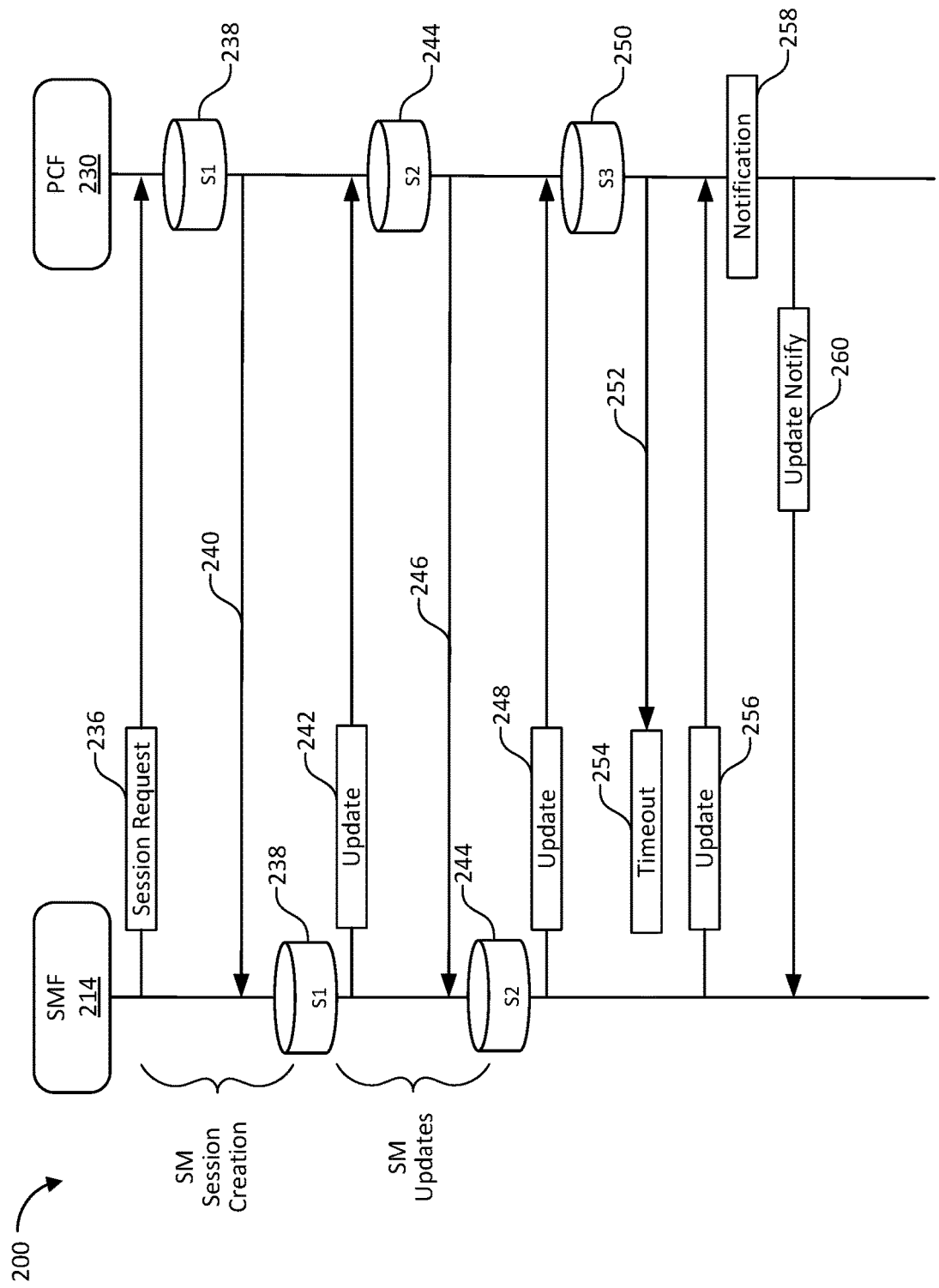
FIG. 2 illustrates an example SMF-PCF inconsistency scenario, according to an embodiment herein.
Figure 3:
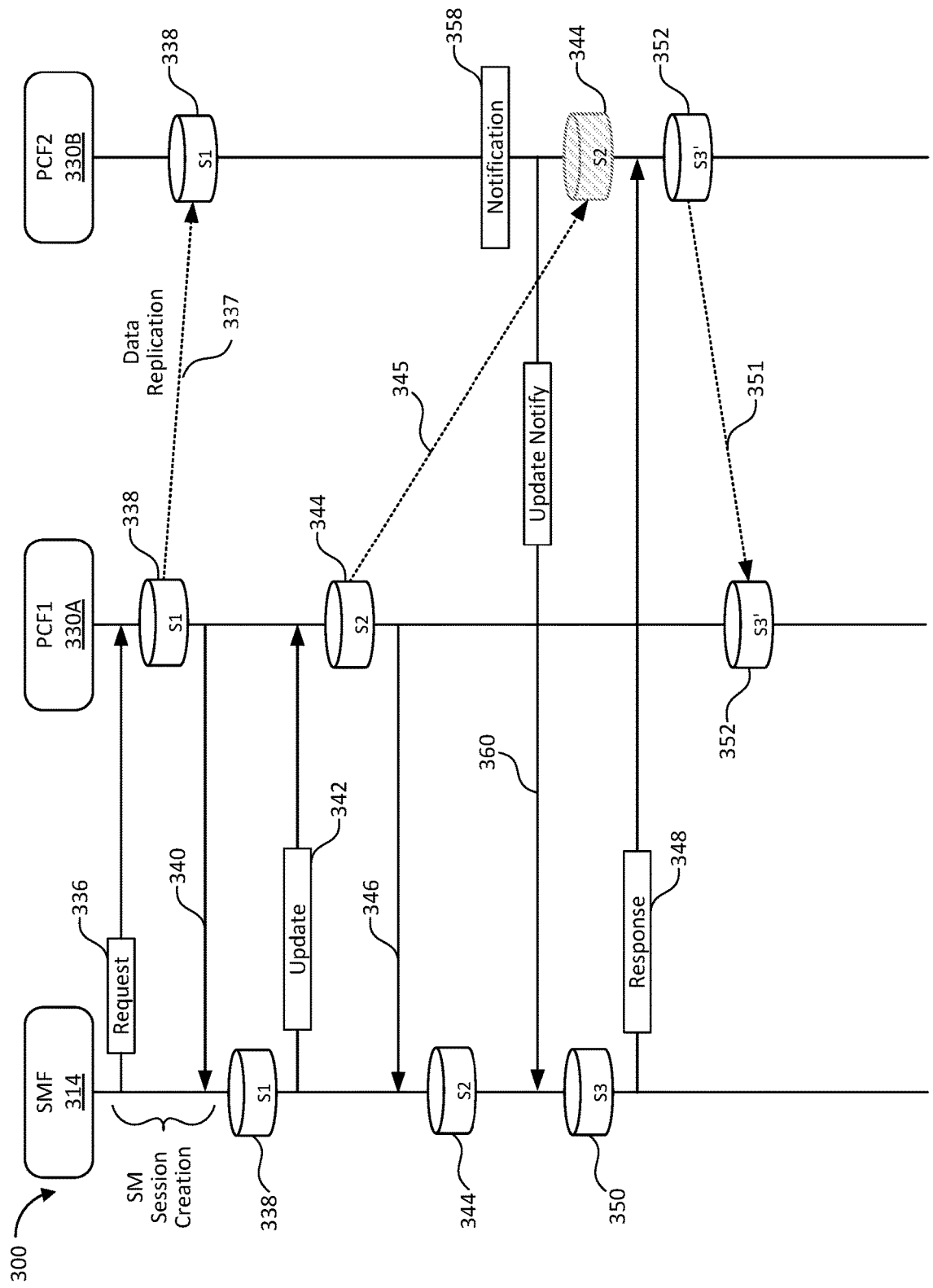
FIG. 3 illustrates another example SMF-PCF inconsistency scenario involving multiple PCFs, according to an embodiment herein.

Turning now to FIGS. 2-3, exemplary miscoordination scenarios that result in SMF-PCF inconsistencies are illustrated. Starting with FIG. 2, an example SMF-PCF inconsistency scenario 200 is illustrated, according to an embodiment herein. As illustrated, the scenario 200 involves a SMF 214 and a PCF 230, which may be the same or similar to the SMF 114 and the PCF 130 within the 5G network 100. As such, the SMF 214 and the PCF 230 work collaboratively to establish and maintain a communication session for a respective UE, such as the UE 104, within the 5G network. In the illustrated example, the SMF 214 is the NF consumer and the PCF 230 is the NF producer.

When a UE initiates a communication session, the SMF 214 transmits a session request 236 to the PCF 230, such as an "Npcf_SMPolicyControl_Create" request. The session request 236 initiates the establishment of a communication session within the 5G network between the UE and respective end point. The session request 236 includes pertinent information for establishing the session, such as QoS requirements, user authentication details, and application-specific parameters. In other words, the session request 236 includes state data that enables the PCF 230 to make informed policy decisions and orchestrate a tailored session that meets the specific needs of the UE and associated services.

When the PCF 230 receives the session request 236, the PCF 230 establishes a communication session at a first state 238 based off of the state data provided in the session request 236. Once the session at the first state 238 is established, the PCF 230 transmits a communication 240 to the SMF 214, such as a response including a "201—Created" HTTP response code. The communication 240 typically includes details about the approved policies, QOS parameters, and any specific conditions or constraints associated with the first state 238 of the session as established. As those skilled in the art readily appreciate, the communication 240 enables the SMF 214 to synchronize its session management functions with the policies set by the PCF 230, ensuring consistent and optimized control over the communication session throughout its duration. As illustrated, upon receipt of the communication 240, the SMF 214 begins operating according to the policies, QoS parameters, and the like of the first state 238.

At some later point, the SMF 214 transmits a communication, such as an update 242, to the PCF 230. The update 242 may be a Policy Control Update Request that includes information relating to the communication session that requires an update in policies or QoS parameters. The update 242 may encompass details such as change in bandwidth requirements, priority levels, latency constraints, or other attributes associated with the user's session. Upon receipt of the update 242, the PCF 230 processes the update 242 to dynamically adapt and enforce policies based on the evolving needs of the session, ensuring a responsive and tailored network experience for the UE and associated services. In other words, when the PCF 230 receives the update 242, the state of the communication session is updated from the first state 238 to a second state 244. Once the second state 244 is implemented, the PCF 230 transmits the state data in a communication 246 to the SMF 214, for example as part of a "200—OK" HTTP status response message. Once the SMF 214 receives the communication 246, the SMF 214 updates to the second state 244. As used herein, the term "communication" may encompass any exchange between an NF consumer, here the SMF 214, and a NF producer, here the PCF 230. For example, a communication between these two NFs includes any internal exchanges (e.g., policy rule change by operator) or external exchanges (Rx/N7 request for corresponding N7 session or UDR/CFH notifications).

At another later point, the SMF 214 may transmit a second communication, such as a second update 248. Since the SMF 214 requests updates when the conditions or requirements of the ongoing communication session change, it can be appreciated that the SMF 214 may transmit numerous updates 242 and 248 during a given communication session. Similar to above, when the PCF 230 receives the second update 248, the PCF 230 processes the update and modifies the session accordingly, here by updating from the second state 244 to a third state 250.

Once the third state 250 of the session is established, the PCF 230 transmits a communication 252, which includes the associated state data for the third state 250, to the SMF 214 so that the SMF 214 can update its state to match the third state 250. Here, however, there is a disruption that causes the communication 252 to not be received by the SMF 214. Network congestion or latency, resource constraints, or communication errors may result in a timeout 254, and the PCF 230 will have no indication that the SMF 214 did not receive the communication 252. While in some cases, the timeout 254 may trigger an error handling mechanism or procedure designed to manage the situation, prior to any resolution of the timeout 254, the communication session continues in a state where the SMF 214 is operating according to the second state 244 and the PCF 230 is operating according to the third state 250.

The SMF 214 may send a subsequent communication 256 at a later point. However, because the PCF 230 and the SMF 214 are operating at two different states, the PCF 230 may not be able to process the communication 256 correctly or at all. As noted above, operating in inconsistent states can lead to a variety of negative consequences for a given communication session. That is, the SMF-PCF inconsistency depicted in the scenario 200 may result in misaligned policy enforcement, leading to suboptimal resource utilization, compromised user experience, and an increased risk of service disruptions or inefficiencies in the dynamic orchestration of network functions.

The SMF-PCF inconsistency may be further exacerbated by the PCF 230 receiving a notification 258. The notification 258 may be an Rx request, UDR notification, or a Chf notification. The notification 258 may be received from another NF, such as the AF 134, and may include an update to various policies or QoS parameters for the communication session. Responsive to receiving the notification 258, the PCF 230 transmits a communication, such as an update notify 260, to the SMF 214. The update notify 260 may notify the SMF 214 about changes in policies or conditions relating to the ongoing communication session. For example, the update notify 260 may include updates to the QoS parameters, changes in access control policies, or any other information that the SMF 214 needs to be aware of to adapt its management of the session accordingly. The SMF 214, however, is unable to appropriately process the update notify 260 to achieve the correct state because the SMF 214 is operating according to the second state 244. Again, such an SMF-PCF inconsistency can result in a variety of adverse consequences.

Turning now to FIG. 3, another example SMF-PCF inconsistency scenario 300 involving multiple PCFs is illustrated, according to an embodiment herein. As shown, the scenario 300 involves a SMF 314, a first PCF 330A, and a second PCF 330B. The SMF 314 may be the same or similar to the SMF 114, and the first and second PCFs 330A and 330B may be the same or similar to the PCF 130 operating within the 5G network 100. As such, the SMF 314 may transmit a request 336 to the first PCF 330A to establish a communication session. The request 336 may be similar to the request 236 and include state data containing various information needed to establish the session.

Responsive to receiving the request 336, the first PCF 330A establishes the communication session in a first state 338. Then the PCF 330A transmits a communication 340 to the SMF 314 containing state information associated with the first state 338. Upon receipt, the SMF 314 manages the communication session according to the first state 338.

Simultaneously or shortly after establishing the first state 338 for the session, the first PCF 330A performs data replication 337 of the first state 338 to the second PCF 330B. The replication 337 of the state data associated with the first state 338 from a first PCF 330A to the second PCF 330B serves as a critical mechanism to enhance the reliability, availability, and overall performance of a 5G network. For example, data replication 337 ensures high availability by providing a seamless failover mechanism; in the event of the first PCF 330A failure, the second PCF 330B can seamlessly take over, preventing service disruptions. Additionally, data replication 337 supports load balancing, allowing for efficient distribution of processing tasks between PCFs 330A and 330B, thereby optimizing resource utilization and accommodating varying workloads. Once the second PCF 330B receives the data replication 337, the second PCF 330B stores the first state data 338 and begins operating accordingly.

At some point, the SMF 314 transmits an update 342 to the first PCF 330A. Responsive to receiving the update 342, the first PCF 330A updates to a second state 344 and transmits a communication 346 back to the SMF 314. Similar to or the same as the communication 246, the communication 346 contains state data associated with the second state 344 such that when the SMF 314 receives the communication 346, the SMF 314 manages the session according to the second state 344.

As illustrated, the first PCF 330A performs data replication 345 to replicate the state data associated with the second state 344 to the second PCF 330B. However, before the second PCF 330B receives and processes the data replication 345, the second PCF 330B receives a notification 358. As can be appreciated, network congestion, communication errors, resource constraints, and the like may cause delayed receipt of the data replication 345 by the second PCF 330B. In another example, the notification 358 may be transmitted to the second PCF 330B prior or simultaneous to the data replication 345 such that the second PCF 330B receives notification 358 before the data replication 345.

Responsive to receiving the notification 358, the second PCF 330B transmits an update notify 360 to the SMF 314. Upon receiving the update notify 360, the SMF 314 implements a third state 350 according to the update notify 360 and transmits a response 348 to the second PCF 330B. When the second PCF 330B receives the response 348 from the SMF 314, the second PCF 330B implements the third state data, as confirmed by the response 348.

When the second PCF 330B implements the third state data, however, the response 348 is applied to the second PCF 330B's current state, which is the first state 338, not the second state 344 that the SMF 314 is working on. As such, when the second PCF 330B updates its current state based on the third state data, a third prime state 352 is generated. As can be appreciated, depending on what state the notification 358 was intended to apply to, application of the response 348 to the first state 338, instead of the second state 344, is likely to result in a mismatch between the SMF 314 and the second PCF 330B. The mismatch is further exacerbated by the second PCF 330B performing data duplication 351 of the third prime state 352 to the first PCF 330A. Now both the first and second PCFs 330A and 33B are running on inconsistent states from the SMF 314.

As is illustrated by the simplistic depiction of scenario 300, one or more NFs can be operating according to inconsistent states in a minimal number of actions. Accordingly, it is advantageous to proactively identify and reconcile any misalignments or inconsistencies in operating states between NFs, such as the SMF 314, the first PCF 330A, and the second PCF 330B.

Figure 4:
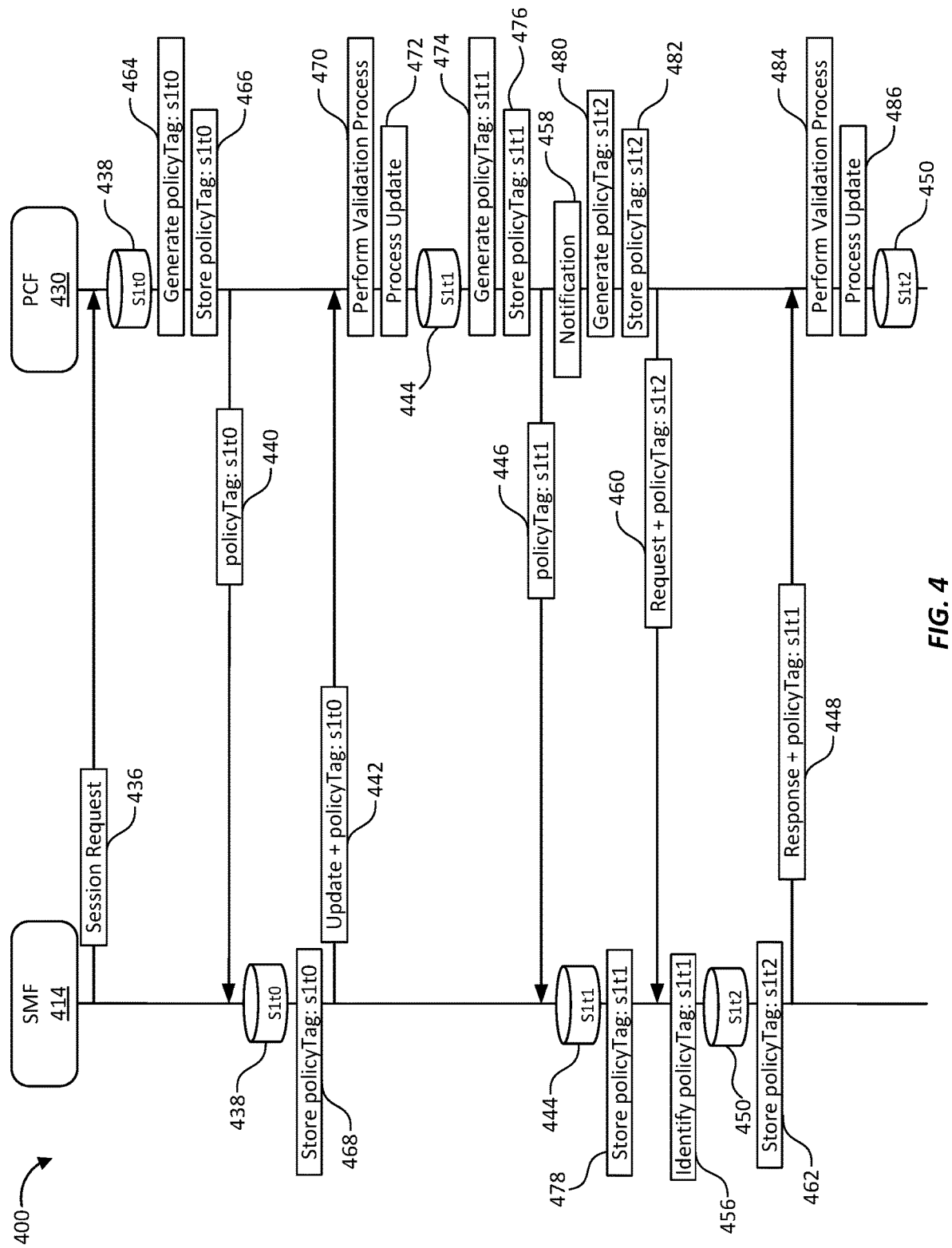
FIG. 4 illustrates an operational scenario illustrating use of policy tags between an NF producer and an NF consumer, according to an embodiment herein.
Figure 5:
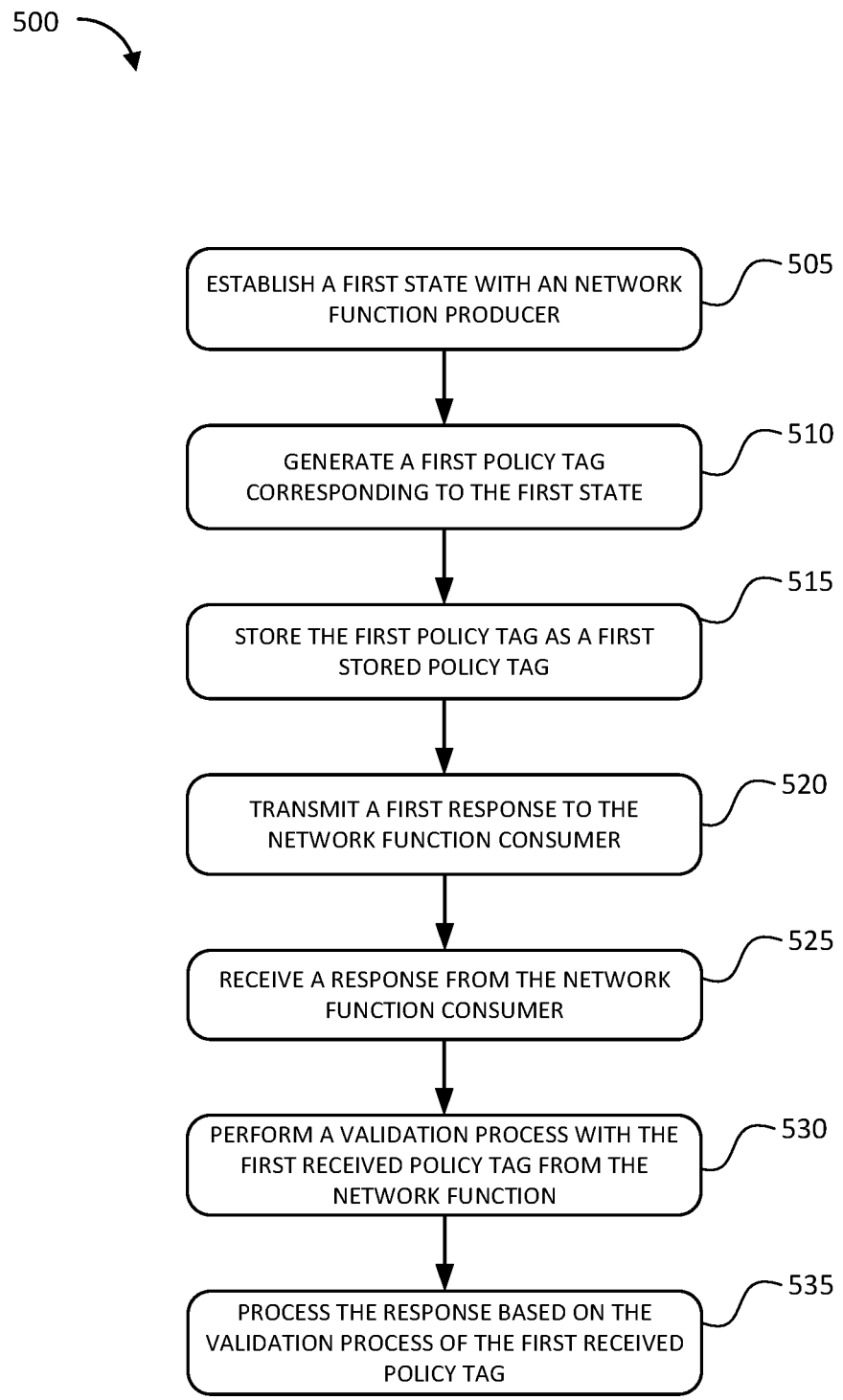
FIG. 5 illustrates an example policy tag process, in particular, a process for proactively detecting and reconciling inconsistencies between two or more NFs using policy tags, according to an embodiment herein.

Turning now to FIGS. 4-10, example policy tags and related functions are described for proactively detecting and reconciling inconsistencies between two or more NFs. Starting with FIG. 4, FIG. 4 provides an operational scenario 400 illustrating use of policy tags between an NF producer and an NF consumer, according to an embodiment herein. FIG. 4 is described in tandem with FIG. 5 for illustrative purposes. FIG. 5 illustrates a process 500 for proactively detecting and reconciling inconsistencies between two or more NFs using policy tags, according to an embodiment herein. For ease of discussion, the process 500 is referred to herein as the policy tag process. Additionally, it should be appreciated that while the process 500 is described with reference to FIG. 4, that one or more steps of the process 500 is equally applicable to any other Figure or component within a Figure provided herein.

With reference to FIG. 4, the operational scenario 400 includes two NFs, one of which operates as a NF consumer and the other operates as a NF producer. In the illustrated example, the NF consumer is a SMF 414 and the NF producer is a PCF 430, which may be the same or similar to the SMF 114 and the PCF 130, respectively. As such, the SMF 414 and the PCF 430 are communicatively coupled to exchange communications or messages within a 5G network, such as the 5G network 100.

At some point, the SMF 414 transmits a session request 436 to the PCF 430 to establish a session. Upon receipt of the request 436, the PCF 430 establishes the session according to state data present within the request 436. In particular, the PCF 430 establishes a first state 438 for the session (505). As part of or subsequent to establishing the first state 438, the PCF 430 generates 464 a first policy tag (s1t0) for the first state 438 (510) and stores (466) the first policy tag (s1t0) along with the corresponding state data for the first state (515). When the PCF 430 stores (466) the first policy tag (s1t0), it is referred to herein as the first stored policy tag (s1t0). The first stored policy tag (s1t0) may be stored in a database (DB) associated with the PCF 430.

As described above, policy tags, such as the first policy tag (s1t0), provide a means for detecting inconsistencies between a NF producer, here the PCF 430, and a NF consumer, here the SMF 414. To detect inconsistencies, policy tags include an opaque identifier that is assigned by a server or by the NF producer, here the PCF 430, and indicates a specific version of a resource. The opaque identifier is opaque in that a UE or client is unaware of how each policy tag is constructed or even of the policy tag's inclusion within a communication. As such, the inclusion of the policy tag is evident only to the receiving NF consumer, here the SMF 414.

The opaque identifier of the first policy tag (s1t0) includes information relating to a specific version of a resource or state of the session. In the illustrated example, the opaque identifier of the first policy tag (s1t0) includes a site identifier (ID) and a timestamp. The site ID for the first policy tag is "s1" and the timestamp is "t0." In some cases, a site ID refers to an NF Instance ID (e.g., "nfInstanceID") provided by a respective NF. Although the following illustrative examples include a site ID and a timestamp in this format, those skilled in the art should readily appreciate that variations in nomenclature and format are equally contemplated herein. Additionally, variations in information included in the policy tag are also contemplated herein.

By including the opaque identifier as part of the first policy tag (s1t0), not only can an inconsistency be determined, but the opaque identifier provides information on why the inconsistency occurred. That is, not only do policy tags allow for detection of an inconsistency, but a policy tag can provide information about what caused the inconsistency. For example, the policy tag can provide information on what state a NF is functioning according to (e.g., an old state or a new state) and which NF (a first PCF, a second PCF, or the SMF) is operating on the inconsistent state.

Once the first policy tag (s1t0) is generated and stored, the PCF 430 transmits a communication 440 to the SMF 414 (520). As part of the communication 440, the PCF 430 includes the first policy tag (s1t0). When the SMF 414 receives the communication 440, the SMF 414 begins to manage the communication session according to the first state 438. Additionally, the SMF 414 stores 468 the first policy tag (s1t0) as a first received policy tag (s1t0).

When the SMF 414 transmits a communication, such as an update request 442 to the PCF 430, the SMF 414 includes the most recently received policy tag, here the first received policy tag (s1t0). The PCF 430 receives the update request 442 from the SMF 414 (525). Upon receipt of the update request 442, the PCF 430 identifies the first received policy tag (s1t0) in the update request 442 and performs a validation process 470 based on the first received policy tag (s1t0) (430). The validation process may include comparing the first received policy tag (s1t0) to the first stored policy tag (s1t0). In some cases, the validation process may include the PCF 430 recalling a most recently stored policy tag, here the first stored policy tag (s1t0), from the DB prior to comparing the first stored policy tag (s1t0) to the first received policy tag (s1t0). Comparing the first stored policy tag (s1t0) to the first received policy tag (s1t0) may include determining whether the first received policy tag (s1t0) matches the first stored policy tag (s1t0) or whether there is a mismatch between the two policy tags.

Depending on the validation process, the PCF 430 processes the update request 442 accordingly (535). For example, if the PCF 430 determines that there is a match between the first received policy tag (s1t0) and the first stored policy tag (s1t0), then the PCF 430 proceeds with processing the update 472, such as by implementing state data present in the update request 442. If the PCF 430 determines a mismatch between the first received policy tag (s1t0) and the first stored policy tag (s1t0), then the PCF 430 may perform a reconciliation process, as will be described in greater detail with respect to FIG. 6-10.

As illustrated, the PCF 430 performs the validation process 470 prior to processing the update 472 from the SMF 414. As can be appreciated, by performing the validation process 470 prior to processing the update 472, the PCF 430 can detect whether the SMF 414 is operating at an inconsistent state from the PCF 430. If the SMF 414 is operating at an inconsistent state then the PCF 430 can determine an appropriate reconciliation process instead of processing the update, as is the current approach. As is evident by FIGS. 2 and 3, processing updates when the NF consumer and the NF producer are operating on inconsistent states perpetuates the issue and can amplify the inconsistency between the two NFs. As such, the PCF 430 may only process the update 472 when the first received policy tag (s1t0) is validated as matching the first stored policy tag (s1t0), thereby indicating that both the SMF 414 and the PCF 430 are operating on consistent states.

Upon processing the update 472, the PCF 430 establishes a second state 444. Along with establishing the second state 444, the PCF 430 also generates a second policy tag (s1t1) 474 and stores the second policy tag (s1t1) 476 as a second stored policy tag (s1t1). The PCF 430 then transmits the second policy tag (s1t1) to the SMF 414, where the SMF 414 in turn implements the second state 444 and stores the second policy tag (s1t1) 478 as a second received policy tag (s1t1).

In the illustrated scenario 400, while the SMF 414 implements the second state 444, the PCF 430 receives a notification 458, which may be the same or similar to the notification 358. Pursuant to the notification 458, the PCF 430 generates a third policy tag (s1t2) 480 and stores the third policy tag (s1t2) 482 as a third stored policy tag (s1t2). The PCF 430 then transmits the third policy tag (s1t2) to the SMF 414 along with a communication, such as an update request 460 requesting that the SMF 414 update based on state data provided in the notification 458.

Upon receipt of the request 460, the SMF 414 identifies the most recently received policy tag 456. The most recently received policy tag is the policy tag that the SMF 414 most recently received and stored prior to receiving the request 460. Here, the most recently received policy tag is the second received policy tag (s1t1). Either before or after the SMF 414 responds to the PCF 430 via a response 448, the SMF 414 may implement a third state 450 and store the third policy tag (s1t2) 462 as a third received policy tag (s1t2). That is, in some cases, the SMF 414 may first establish the third state 450 and store the third received policy tag (s1t2) 462 before transmitting the response 448, while in other cases, the SMF 414 may transmit the response 448 first. In still another example, the SMF 414 may transmit the response 448 simultaneously to establishing the third state 450 and storing the third received policy tag (s1t2) 462.

When responding to the request 460, the SMF 414 transmits a response 448 that includes the second received policy tag (s1t1). When the PCF 430 receives the response 448, the PCF 430 performs the validation process 484. The validation process 484 may include determining a most recently stored policy tag, here the second stored policy tag (s1t1) and comparing the second stored policy tag (tls1) to the second received policy tag (s1t1) to each other to determine if they match.

Then based on the validation process 484, the PCF 430 processes the update 486 based on the notification 458 accordingly. Here, since the second received policy tag (s1t1) received from the SMF 414 matches the second stored policy tag (s1t1), the PCF 430 determines that the two NFs are operating according to consistent states. As such, the PCF 430 processes the update 486, which in this case means implementing the third state 450.

Figure 6:
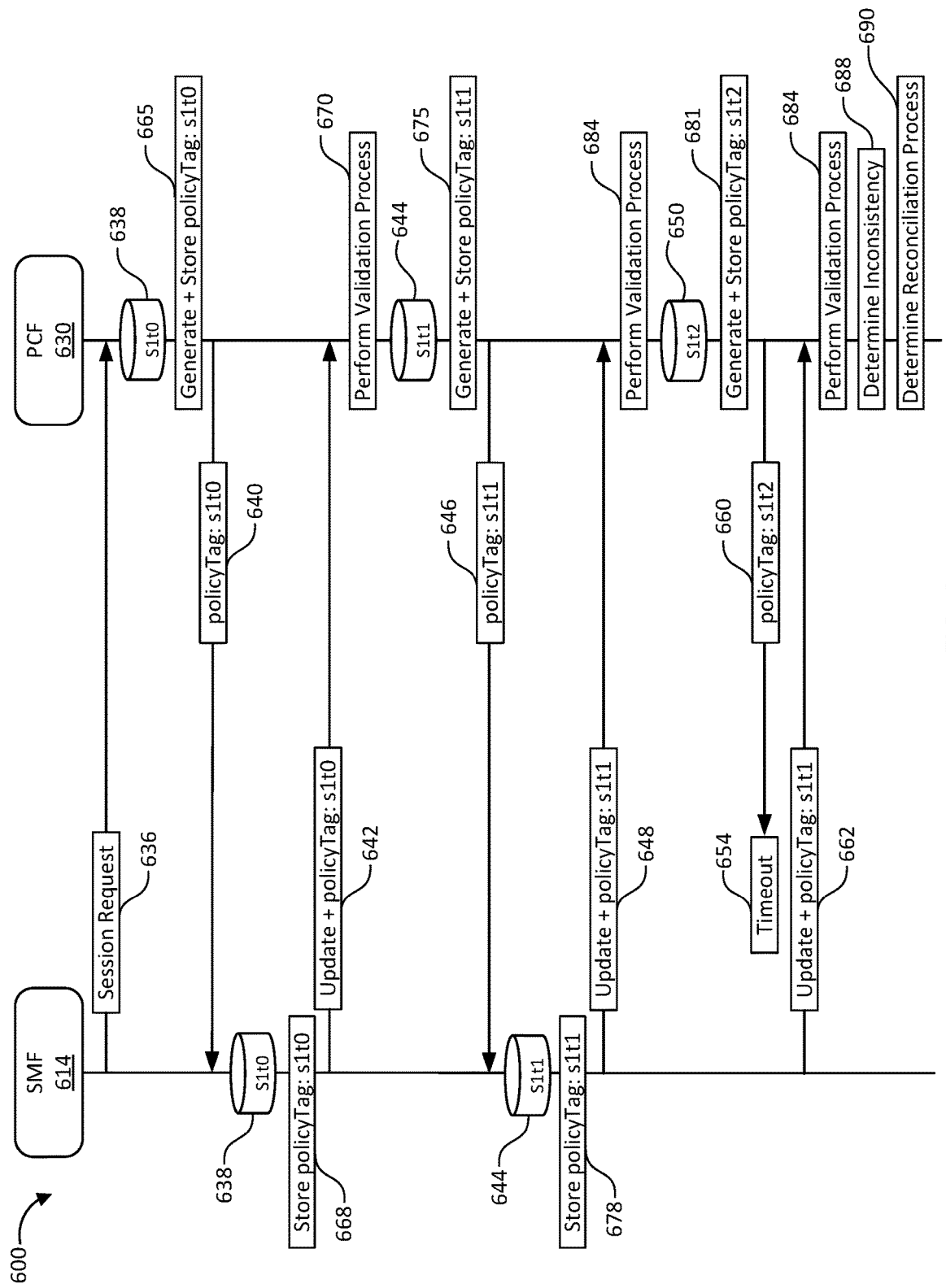
FIG. 6 illustrates an operational scenario illustrating detection of an inconsistency using policy tags, according to an embodiment herein.

Turning now to FIGS. 6-10, example scenarios in which an inconsistency is detected, and the PCF continues to determine a reconciliation process are illustrated. Referring now to FIG. 6, an operational scenario 600 illustrating detection of an inconsistency using policy tags is provided, according to an embodiment herein. The scenario 600 includes an NF consumer, here SMF 614, and an NF producer, here PCF 630. The SMF 614 and the PCF 630 may be the same or similar to the SMF 414 and the PCF 430, respectively. As shown, the SMF 614 transmits a session request 636 to the PCF 630 to initiate a communication session within a 5G network, such as the 5G network 100. Responsive to receiving the request 636, the PCF 630 establishes the session in a first state 638. The PCF 630 then generates and stores a first policy tag (s1t0) 665 as a first stored policy tag (s1t0).

Once generated, the PCF 630 transmits the first policy tag (s1t0) to the SMF 614, which in turn implements the first state 638 and stores the first policy tag (s1t0) 668 as a first received policy tag (s1t0). At a later point, the SMF 614 transmits a communication, such as an update 642, along with the first received policy tag (s1t0) to the PCF 630. Upon receipt of the update 642, the PCF 630 performs a validation process 670 based on the first received policy tag (s1t0) received as part of the update 642 and the first stored policy tag (s1t0). Once validated that the two policy tags match, the PCF 630 processes the update and implements the update as a second state 644. Responsive to implementing the second state 644, the PCF 630 generates and stores a second policy tag (s1t1) 675 as a second stored policy tag (s1t1). The PCF 630 then transmits a communication 646, along with the second policy tag (s1t1) to the SMF 614.

Responsive to receiving the communication 646, the SMF 614 implements the second state 644 and stores the second policy tag (s1t1) as a second received policy tag (s1t1). At a later point, the SMF 614 transmits a communication, such as an update request 648 to the PCF 630. The update request 648 includes the second received policy tag (s1t1). Upon receipt of the update request 648, the PCF 630 performs a validation process 684 and validates that the second received policy tag (s1t1) and the second stored policy tag (s1t1) match. Based on this validation, the PCF 630 processes the update request 648 and implements a third state 650. Since a new state is implemented, the PCF 630 generates and stores a third policy tag (s1*t*2) 681 as a third stored policy tag (s1*t*2).

Next, the PCF 630 transmits a communication 660 including the third policy tag (s1*t*2) to the SMF 614. However, as illustrated, the communication 660 does not reach the SMF 614 and instead times out 654. Since the SMF 614 doesn't receive the communication 660, the SMF 614 is not aware that the PCF 630 implemented the third state 650 and instead continues operating according to the second state 644. As such, when the SMF 614 transmits a communication, such as an update request 662 to the PCF 630 at some later point, the update request 662 includes the second received policy tag (s1*t*1).

Since the SMF 614 is operating according to the second state 644 and the PCF 630 is operating according to the third state 650 as indicated by each NFs most recent policy tag, when the PCF 630 performs a validation process 684, the PCF 630 determines an inconsistency 688. When the PCF 630 determines an inconsistency 688, the PCF 630 then determines a reconciliation process 690 to rectify the inconsistency. The reconciliation process 690 may rectify the identified inconsistency between the SMF 614 and the PCF 630.

The PCF 630 may initiate a reconciliation process 690 based on a variety of status information, such as the most recent stored policy tag or received policy tag, and/or a replication status with a leader NF. In some examples, the PCF 630 selects a reconciliation process 690 based on the type of inconsistency and operation configuration. For example, reconciliation process 690 may include a last-update-wins reconciliation process, termination of the communication session, merging of session records, resynchronization of states between the PCF 630 and the SMF 414, or rebuilding the session or state at the PCF 630. Each of these reconciliation processes are described in turn below.

In an example, the PCF 630 may select the last-update-wins reconciliation process if the update 662 includes full state data. For example, if the update 662 includes all of the state data for a new state required by the PCF 630 to implement the new state. If the PCF 630 determines that the update 662 includes all necessary state data for the new state, then the PCF 630 may select the last-update-wins reconciliation process and implement the new state.

In another example, the PCF 630 may determine that terminating the communication session is the appropriate reconciliation process given the operational configuration and the type of inconsistency. For example, the PCF 630 may determine that the operational configuration indicates that the communication session is a small duration session and the inconsistency with the SMF 614 is too great to implement any of the other reconciliation processes. As such, the PCF 630 may trigger a session termination process and allow the SMF 614 to request session re-establishment.

In another example, the PCF 630 may determine that merging of session records or states is an appropriate reconciliation process. For example, the update request 662 may include a partial update that does not overlap with the third state 650. As such, the PCF 630 processes the update 662 and merges the update 662 with the third state 650 to establish a fourth state (not shown). The fourth state may include the updates 662 merged with the state data of the third state 650.

In another example, the PCF 630 may determine that resynchronization of the session states is an appropriate reconciliation process. The PCF 630 may select this reconciliation process when a correct state cannot be determined locally. As such, the PCF 630 may fetch state data from respective NF producers (e.g., UDR/CHF) to rebuild the correct state. Once fetched, the PCF 630 may transmit the correct state data to the SMF 614 such that both NFs can implement the correct state data and resynchronize to the same state.

In another example, the PCF 630 may determine that rebuilding the session or state is an appropriate reconciliation process. For example, the PCF 630 may have received multiple versions of each state from the SMF 614 and may have an index of the transaction history between the PCF 630 and the SMF 614. As such, the PCF 630 can rebuild to an appropriate state based on the transaction history of session states and updates transmitted between the SMF 614 and the PCF 630. In some cases, the PCF 630 may also fetch state data from respective NF producers (e.g., UDR/CHF) to aid in determining a correct state.

Once the PCF 630 determines the appropriate reconciliation process 690, the PCF 630 implements that reconciliation process and reconciles the inconsistency between the SMF 614 and the PCF 630. Once reconciled, the SMF 614 and the PCF 630 continue the communication session according to the same state.

Figure 7:
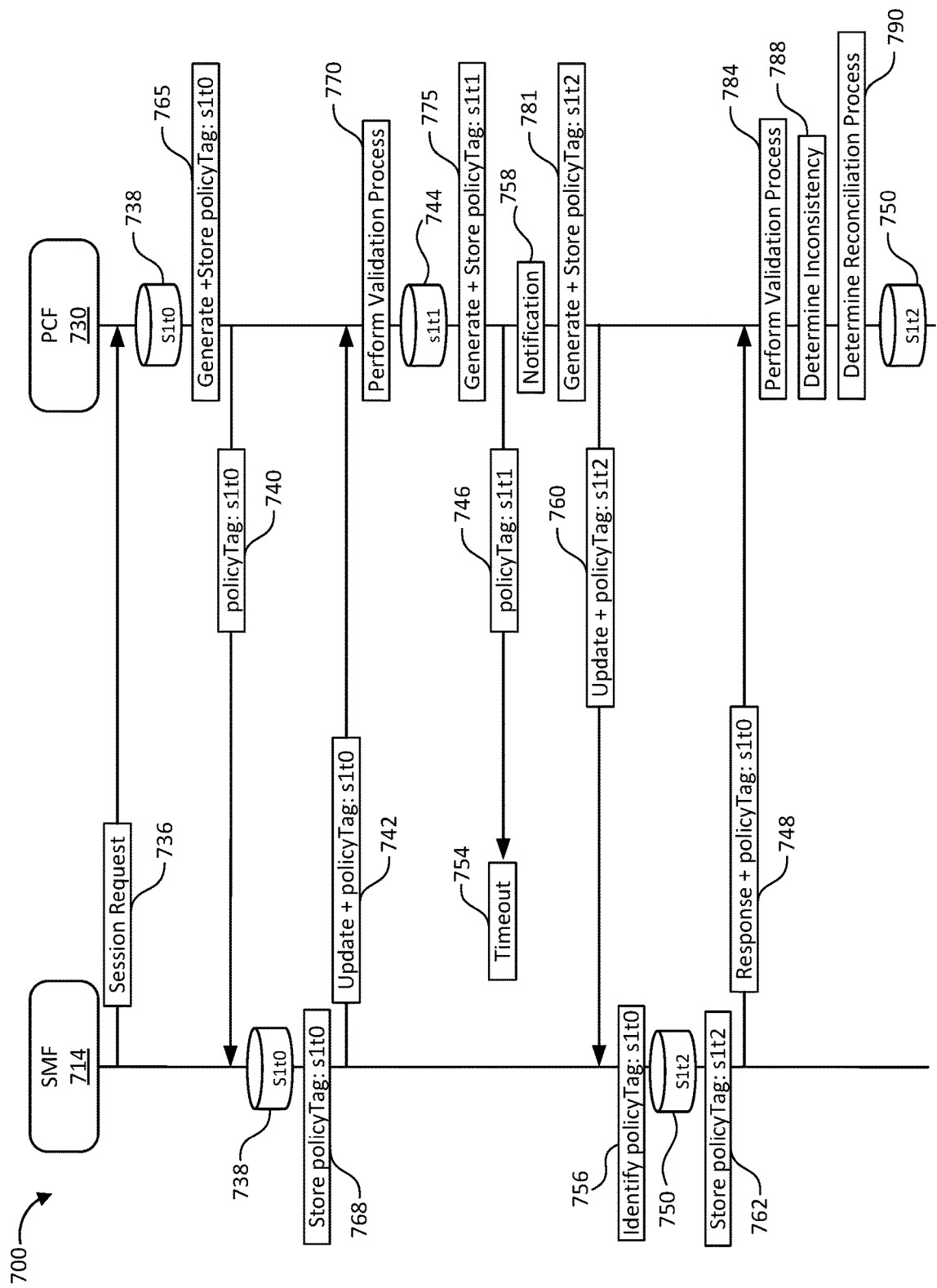
FIG. 7 illustrates another operational scenario illustrating detection of an inconsistency using policy tags, according to an embodiment herein.

Referring now to FIG. 7, another operational scenario 700 illustrating detection of an inconsistency using policy tags is provided, according to an embodiment herein. The scenario 700 includes an NF consumer, here SMF 714, and an NF producer, here PCF 730. The SMF 714 and the PCF 730 may be the same or similar to the SMF 414 and the PCF 430, respectively. As shown, the SMF 714 transmits a session request 736 to the PCF 730 to initiate a communication session within a 5G network, such as the 5g network 100. Responsive to receiving the request 363, the PCF 730 establishes the session in a first state 738. The PCF 730 then generates and stores a first policy tag (s1*t*0) 765 as a first stored policy tag (s1*t*0).

Once generated, the PCF 730 transmits the first policy tag (s1*t*0) to the SMF 714, which in turn implements the first state 738 and stores the first policy tag (s1*t*0) 768 as a first received policy tag (s1*t*0). At a later point, the SMF 714 transmits an update 742 along with the first received policy tag (s1*t*0) to the PCF 730. Upon receipt of the update 742, the PCF 730 performs a validation process 770 based on the first received policy tag (s1*t*0) received as part of the update 742 and the first stored policy tag (s1*t*0). Once validated that the two policy tags match, the PCF 730 processes the update and implements the update as a second state 744. Responsive to implementing the second state 744, the PCF 730 generates and stores a second policy tag (s1*t*1) 775 as a second stored policy tag (s1*t*1). The PCF 730 then transmits a communication 746 including the second policy tag (s1*t*1) to the SMF 714. The SMF 714, however, does not receive the communication 746 due to a timeout 754. As such, the SMF 714 continues operating according to the first state 738.

At a subsequent time, the PCF 730 receives a notification 758, which may be the same as the notification 358. Responsive to the notification 758, the PCF 730 generates and stores a third policy tag (s1*t*2) 781 as a third stored policy tag (s1*t*2). The PCF 730 then transmits a communication 760 (e.g., an update request) including the third policy tag (s1*t*2) to the SMF 714. Responsive to receiving the communication 760, the SMF 714 determines a most recently received policy tag 756. The most recently received policy tag is the policy tag that was most recently received before the communication 760 was received. In other words, as used herein, the most recently received policy tag is not the policy tag that is included in the communication 760. Because the SMF 714 did not receive the second policy tag (s1t1) from the PCF 730 due to the time out 754, the SMF 714 identifies the most recently received policy tag as the first received policy tag (s1t0) 756.

As noted above, the SMF 714 then establishes a third state 750 based on the communication 760 and stores the third policy tag (s1t2) 762 as a third received policy tag (s1t2). Simultaneously, prior to, or directly subsequent to establishing the third state 750 and storing the third received policy tag (s1t2) 762, the SMF 714 transmits a response 748 including the identified most recently received policy tag (s1t0) to the PCF 730.

Since the SMF 714 is operating according to the first state 738 and the PCF 730 is operating according to the second state 744, as indicated by each NFs most recent policy tag, when the PCF 730 performs a validation process 784, the PCF 730 determines an inconsistency 788. When the PCF 730 determines an inconsistency 788, the PCF 730 then determines one or more reconciliation processes 790 to rectify the inconsistency. As noted above, the PCF 730 selects a reconciliation process based on the type of inconsistency and the operational configuration of the NFs. In the illustrated example, the PCF 730 determines that the last-update-wins reconciliation process is an appropriate reconciliation process and as such, the PCF 730 updates to the third state 750.

As can be appreciated, there may be scenarios in which the timeout 754 does not occur and the SMF 714 receives the communication 746. Upon receipt of the communication 748 which includes the second policy tag (s1t1), the SMF 714 may store the second policy tag (s1t1) and update to the second state 744. At a later time in this scenario, the PCF 730 may transmit the communication 760 including the third policy tag (s1t2) to the SMF 714, to which the SMF 714 transmits the response 748. In this scenario, however, the response 748 may timeout (not shown) and thus the PCF 730 may not receive the response 748. Because the PCF 730 does not receive the response 748 from the SMF 714, the PCF 730 will continue operating according to the second state 744 and may not update to the third state (750). As such, at a later point when the PCF 730 and the SMF 714 exchange state information, and each provides a most recently stored policy tag, the validation process 784 may be performed to identify the inconsistency between the SFM 714 and the PCF 730 as described above.

Figure 8:
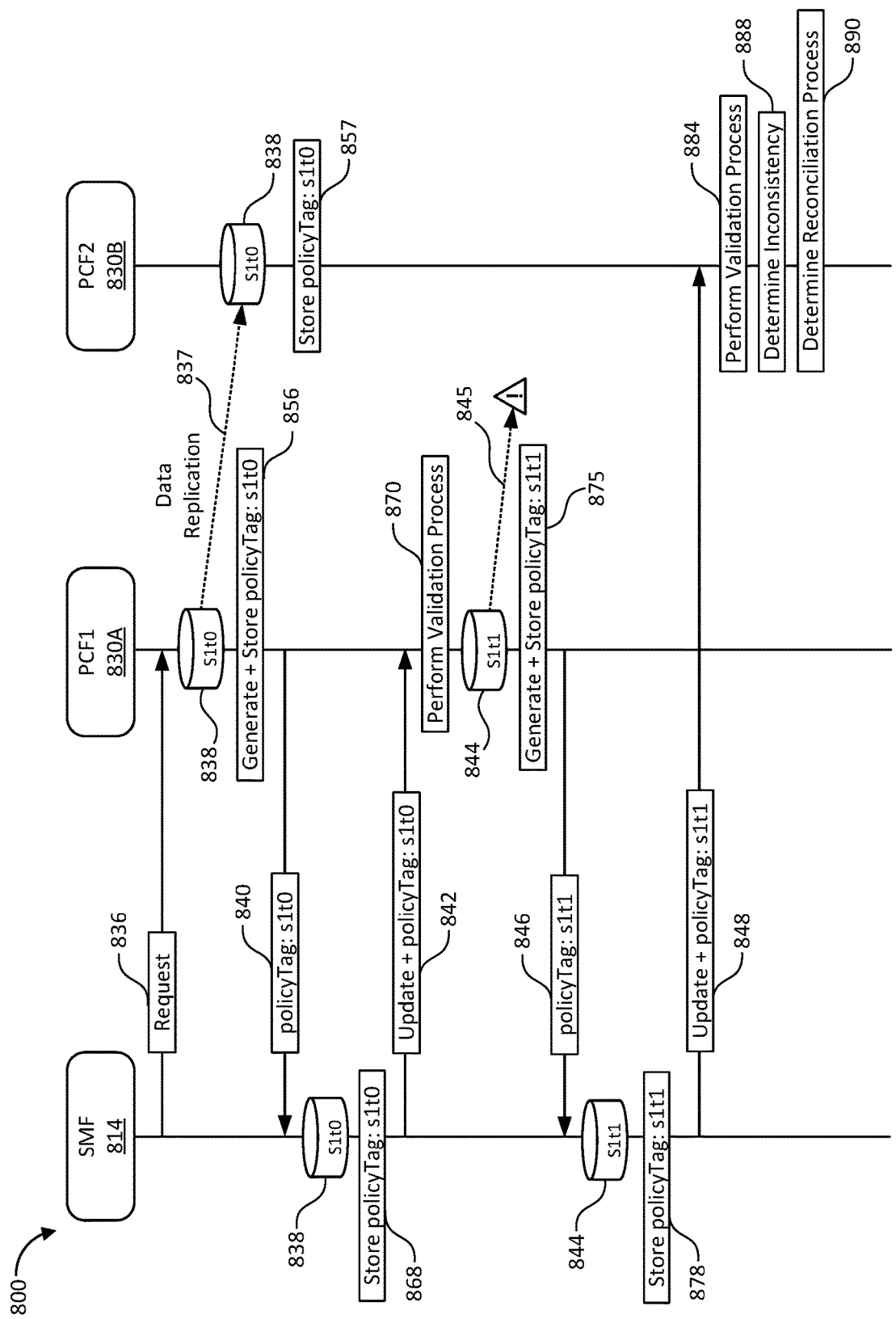
FIG. 8 illustrates an operational scenario illustrating detection of an inconsistency using policy tags involving multiple PCFs, according to an embodiment herein.

Turning now to FIG. 8, an operational scenario 800 illustrating detection of an inconsistency using policy tags involving multiple PCFs is provided, according to an embodiment herein. The scenario 800 includes an NF consumer, here SMF 814, a first NF producer, here PCF 830A, and a second NF producer, here PCF 830B. The SMF 814 may be the same or similar to the SMF 414, and the first PCF 830A and the second PCF 830B may be the same or similar to the PCF 430. As shown, the SMF 814 transmits a session request 836 to the first PCF 830A to initiate a communication session within a 5G network, such as the 5g network 100. Responsive to receiving the request 836, the first PCF 830A establishes the session in a first state 838. The first PCF 830A then generates and stores a first policy tag (s1t0) 865 as a first stored policy tag (s1t0).

Once generated, the first PCF 830A transmits the first policy tag (s1t0) to the SMF 814, which in turn implements the first state 838 and stores the first policy tag (s1t0) 868 as a first received policy tag (s1t0). The first PCF 830A also transmits a data replication 837 to the second PCF 830B. Upon receipt, the second PCF 830B implements the first state 838 based on the data replication 837 and stores the first policy tag (s1t0) 857 as a first stored policy tag (s1t0) by the second PCF 830B.

At a later point, the SMF 814 transmits a communication, such as an update 842, along with the first received policy tag (s1t0) to the first PCF 830A. Upon receipt of the update 842, the first PCF 830A performs a validation process 870 based on the first received policy tag (s1t0) received as part of the update 842 and the first stored policy tag (s1t0). Once validated that the two policy tags match, the first PCF 830A processes the update and implements the update as a second state 844. Responsive to implementing the second state 844, the first PCF 830A generates and stores a second policy tag (s1t1) 875 as a second stored policy tag (s1t1). The first PCF 830A then transmits the second policy tag (s1t1) 846 to the SMF 814. Responsive to receiving the communication 846, the SMF 814 implements the second state 844 and stores the second policy tag (s1t1) as a second received policy tag (s1t1).

As shown, the first PCF 830A attempts to replicate data 845 corresponding to the second state 844 to the second PCF 830B, however, the replication fails to be received by the second PCF 830B. As noted above, the failure to replicate data 845 to the second PCF 830B could be due to a variety of disruptions, such as network congestion, resource constraints, communication errors, and the like. Because the second PCF 830B does not receive the replicated data 845, the second PCF 830B continues to operate according to the first state 838, while the first PCF 830A and the SMF 814 operate according to the second state 844.

At a subsequent time, the SMF 814 transmits a communication, such as an update request 848 to the second PCF 830B. The update request 848 includes the second received policy tag 878. Upon receipt of the update request 848, the second PCF 830B performs a validation process 884. Since the SMF 814 is operating according to the second state 844 and the second PCF 830B is operating according to the first state 838 as indicated by each NFs most recent policy tag, when the second PCF 830B performs a validation process 784, the second PCF 830B determines an inconsistency 888. When the second PCF 830B determines an inconsistency 888, the second PCF 830B then determines one or more reconciliation processes 890 to rectify the inconsistency. As noted above, the second PCF 830B selects a reconciliation process based on the type of inconsistency and the operational configuration of the NFs.

Figure 9:
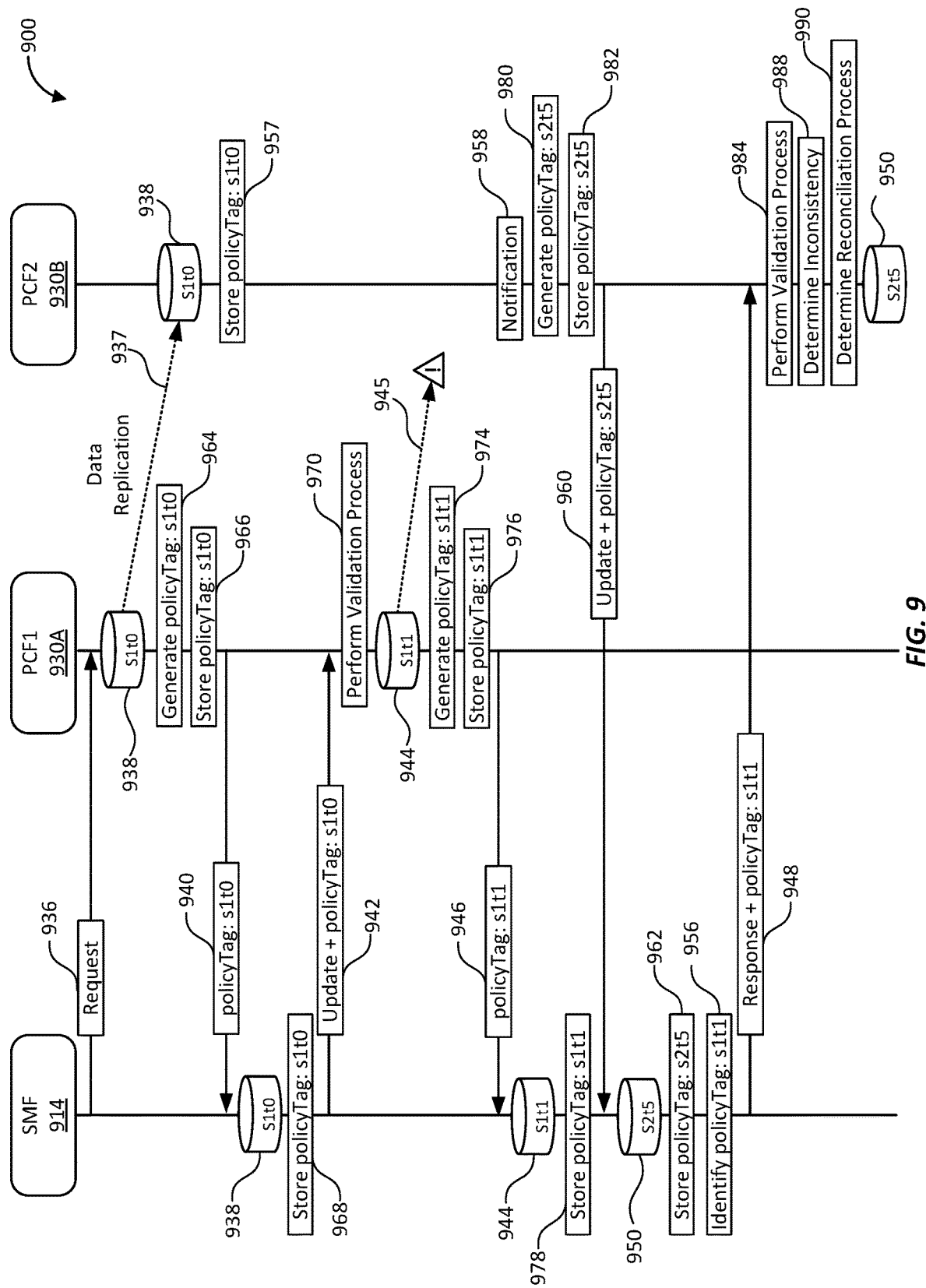
FIG. 9 illustrates another operational scenario illustrating detection of an inconsistency using policy tags involving multiple PCFs, according to an embodiment herein.

Turning now to FIG. 9, another operational scenario 900 illustrating detection of an inconsistency using policy tags involving multiple PCFs is provided, according to an embodiment herein. The scenario 900 includes an NF consumer, here SMF 914, a first NF producer, here PCF 930A, and a second NF producer, here PCF 930B. The SMF 914 may be the same or similar to the SMF 414, and the first PCF 930A and the second PCF 930B may be the same or similar to the PCF 430. As shown, the SMF 914 transmits a session request 936 to the first PCF 930A to initiate a communication session within a 5G network, such as the 5G network 100. Responsive to receiving the request 936, the first PCF 930A establishes the session in a first state 938. The first PCF 930A then generates 964 and stores a first policy tag (s1t0) 966 as a first stored policy tag (s1t0).

Once generated, the first PCF 930A transmits the first policy tag (s1t0) to the SMF 914, which in turn implements the first state 938 and stores the first policy tag (s1t0) 968 as a first received policy tag (s1t0). The first PCF 930A also transmits a data replication 937 to the second PCF 930B. Upon receipt, the second PCF 930B implements the first state 938 based on the data replication 937 and stores the first policy tag (s1*t*0) 957 as a first stored policy tag (s1*t*0) by the second PCF 930B.

At a later point, the SMF 914 transmits an update 942 along with the first stored policy tag (s1*t*0) to the first PCF 930A. Upon receipt of the update 942, the first PCF 930A performs a validation process 970 based on the first received policy tag (s1*t*0) received as part of the update 942 and the first stored policy tag (s1*t*0). Once validated that the two policy tags match, the first PCF 930A processes the update and implements the update as a second state 944. Responsive to implementing the second state 944, the first PCF 930A generates 974 and stores a second policy tag (s1*t*1) 976 as a second stored policy tag (s1*t*1). The first PCF 930A then transmits the second policy tag (s1*t*1) 946 to the SMF 914. Responsive to receiving the communication 946, the SMF 914 implements the second state 944 and stores the second policy tag (s1*t*1) as a second received policy tag (s1*t*1) 978.

As shown, the first PCF 930A attempts to replicate data 945 corresponding to the second state 944 to the second PCF 930B, however, the replication fails to be received by the second PCF 930B. As noted above, the failure to replicate data 945 to the second PCF 930B could be due to a variety of disruptions, such as network congestion, resource constraints, communication errors, and the like. Because the second PCF 930B does not receive the replicated data 945, the second PCF 930B continues to operate according to the first state 938, while the first PCF 930A and the SMF 914 operate according to the second state 944.

At a subsequent time, the second PCF 930B receives a notification 958, which may be the same or similar to the notification 358. Responsive to the notification 958, the second PCF 930B generates a third policy tag (s2*t*5) 980 and stores the third policy tag (s2*t*5) 982 as a third stored policy tag (s2*t*5). The second PCF 930B transmits a communication 960 (e.g., an update request) along with the third policy tag (s2*t*5) to the SMF 914.

Upon receipt of the communication 960 from the second PCF 930B, the SMF 914 may implement the third state 950 and store the third policy tag (s2*t*5) 962 as a third stored policy tag (s2*t*5). Subsequently or simultaneously, the SMF 914 identifies a most recently received policy tag prior to receiving the communication 960, here the second received policy tag (s1*t*1) 956. The SMF 914 then transmits a response 948 along with the second received policy tag (s1*t*1) to the second PCF 930B. The second PCF 930B then performs a validation process 984 to verify that the second received policy tag (s1*t*1) matches its most recently stored policy tag, here the first stored policy tag (s1*t*0). Because the data replication 945 of the second state 944 failed to be received by the second PCF 930B, the second PCF 930B is still operating according to the first state 938. As such, during the validation process 984, the second PCF 930B determines a most recently stored policy tag (e.g., the most recent stored policy tag prior to receiving the notification 958) and compares the recently stored policy tag to the most recently received policy tag that is part of the communication 948.

Because the second PCF 930B and the SMF 914 are operating on two different states, the second PCF 930B determines an inconsistency 988. Pursuant to the inconsistency 988, the second PCF 930B determines an appropriate reconciliation process 990 based on the type of the inconsistency and other session information, as described above. Here, the second PCF 930B may determine that the state data provided in the notification 958 and/or the SMF 914 includes enough state data that the third state 950 is implemented.

Figure 10:
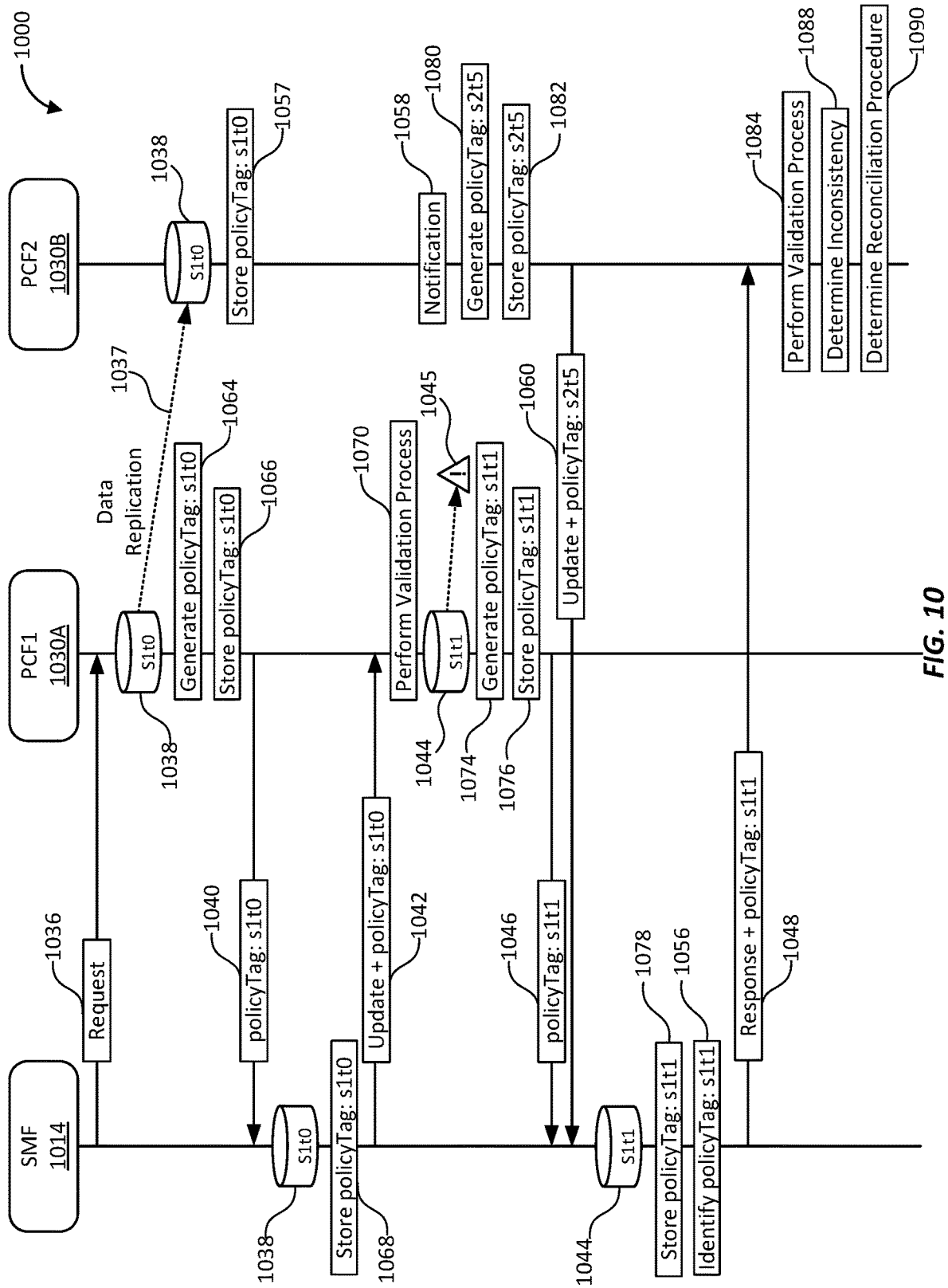
FIG. 10 illustrates another operational scenario illustrating detection of an inconsistency using policy tags involving multiple PCFs, according to an embodiment herein.

Turning now to FIG. 10, another operational scenario 1000 illustrating detection of an inconsistency using policy tags involving multiple PCFs is provided, according to an embodiment herein. The scenario 1000 includes an NF consumer, here SMF 1014, a first NF producer, here PCF 1030A, and a second NF producer, here PCF 1030B. The SMF 1014 may be the same or similar to the SMF 414, and the first PCF 1030A and the second PCF 1030B may be the same or similar to the PCF 430. As shown, the SMF 1014 transmits a session request 1036 to the first PCF 1030A to initiate a communication session within a 5G network, such as the 5g network 100. Responsive to receiving the request 1036, the first PCF 1030A establishes the session in a first state 1038. The first PCF 1030A then generates 1064 and stores a first policy tag (s1*t*0) 1066 as a first stored policy tag (s1*t*0).

Once generated, the first PCF 1030A transmits the first policy tag (s1*t*0) to the SMF 1014, which in turn implements the first state 1038 and stores the first policy tag (s1*t*0) 1068 as a first received policy tag (s1*t*0). The first PCF 1030A also transmits a data replication 1037 to the second PCF 1030B. Upon receipt, the second PCF 1030B implements the first state 1038 based on the data replication 1037 and stores the first policy tag (s1*t*0) 1057 as a first stored policy tag (s1*t*0).

At a later point, the SMF 1014 transmits a communication, such as an update 1042, along with the first received policy tag (s1*t*0) to the first PCF 1030A. Upon receipt of the update 1042, the first PCF 1030A performs a validation process 1070 based on the first received policy tag (s1*t*0) received as part of the update 1042 and the first stored policy tag (s1*t*0). Once validated that the two policy tags match, the first PCF 1030A processes the update and implements the update as a second state 1044. Responsive to implementing the second state 1044, the first PCF 1030A generates 1074 and stores a second policy tag (s1*t*1) 1076 as a second stored policy tag (s1*t*1). The first PCF 1030A then transmits the second policy tag (s1*t*1) 1046 to the SMF 1014. Responsive to receiving the communication 1046, the SMF 1014 implements the second state 1044 and stores the second policy tag (s1*t*1) as a second received policy tag (s1*t*1).

As shown, the first PCF 1030A attempts to replicate data 1045 corresponding to the second state 1044 to the second PCF 1030B, however, the replication fails to be received by the second PCF 1030B. As noted above, the failure to replicate data 1045 to the second PCF 1030B could be due to a variety of disruptions, such as network congestion, resource constraints, communication errors, and the like. Because the second PCF 1030B does not receive the replicated data 1045, the second PCF 1030B continues to operate according to the first state 1038, while the first PCF 1030A and the SMF 1014 operate according to the second state 1044.

The second PCF 1030B operates according to the first state 1038 until it receives a notification 1058. Responsive to the notification 1058, the second PCF 1030B generates a third policy tag (s2*t*5) 1080. The second PCF 1030B stores the third policy tag (s2*t*5) as a third stored policy tag (s2*t*5) 1082. The second PCF 1030B then transmits a communication 1060 to the SMF 1014. The communication 1060 may be an update request based on the notification 1058 that includes the third policy tag (s2*t*5) 1060.

At the same time or at a time before the second PCF 1030B receives a notification 1058 and transmits the communication 1060 to the SMF 1014, the first PCF 1030A transmits a communication 1046 to the SMF 1014 including the second policy tag (s1*t*1). The communication 1046 is received by the SMF 1014 at the same time that the communication 1060 from the second PCF 1030B is received. In this scenario 1000, the SMF 1014 receives the communication 1046 slightly before the communication 1060 and as such begins implementing the second state 1044. As such, the SMF 1014 may continue managing the session according to the second state 1044 and store the second policy tag (s1*t*1) 1078 as the second received policy tag (s1*t*1).

At a time after the SMF 1014 has established the second state 1044, the SMF 1014 identifies 1059 a most recently received policy tag, here the second received policy tag (s1*t*1) and transmits a communication 1048, such as a response to the communication 1060, along with a most recently received policy tag to the second PCF 1030B. When the second PCF 1030B receives the response 1048, the second PCF 1030B performs a validation process 1084 and determines an inconsistency 1088 based on its most recently stored policy tag, here the first stored policy tag (s1*t*0), and the second received policy tag (s1*t*1). When the second PCF 1030B determines an inconsistency 1088, the second PCF 1030B then determines one or more reconciliation processes 1090 to rectify the inconsistency. As noted above, the second PCF 1030B selects a reconciliation process based on the type of inconsistency and the operational configuration of the NFs.

As exemplified by each of the operational scenarios in FIGS. 6-10, policy tags allow NFs to detect inconsistencies between NF states and reconcile the states to avoid adverse impacts of NF inconsistencies. Although in the above scenarios, the PCFs generate respective policy tags, it should be appreciated that in some scenarios, the SMF may generate a policy tag. In other words, although the above description and respective illustrations show the NF producer as a PCF for ease of explanation, in some cases, the NF producer may be an SMF, AMF, UDR, NWDAF, or any other NF producer that exchanges session states with a NF consumer through service requests.

Figure 11:
FIG. 11 shows an example computing device suitable for policy tags and their related functions, according to an embodiment herein.
Figure 11:
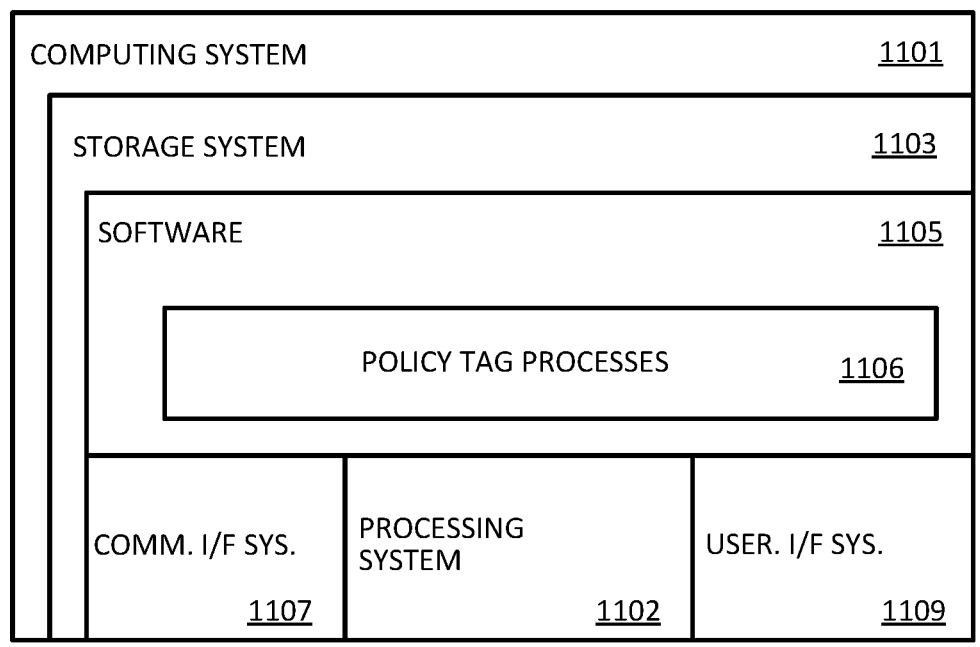

Referring now to FIG. 11, is a diagram of a system 1100 configured to implement policy tags and their related functions, according to an embodiment herein. The system 1100 may be an example of an apparatus including a computing system 1101 that is representative of any system or collection of systems in which the various processes, systems, programs, services, and scenarios disclosed herein may be implemented. For example, computing system 1101 may be an example of one or more NFs within the 5G network 100 of FIG. 1, such as the PCF 130 or the SMF 114. Examples of computing system 1101 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 1101 may be implemented as a single apparatus, system, or device or may be implemented in a distributed manner as multiple apparatuses, systems, or devices. Computing system 1101 may include, but is not limited to, processing system 1102, storage system 1103, software 1105, communication interface system 1107, and user interface system 1109. Processing system 1102 may be operatively coupled with storage system 1103, communication interface system 1107, and user interface system 1109.

Processing system 1102 may load and execute software 1105 from storage system 1103. Software 1105 may include policy tag process 1106, which may be representative of any of the operations for providing a policy tag and/or detecting an inconsistency using one or more policy tags, as discussed with respect to the preceding figures. When executed by processing system 1102, software 1105 may direct processing system 1102 to operate as described herein for at least the various processes, such as the process 500, operational scenarios, and sequences discussed in the foregoing implementations. Computing system 1101 may optionally include additional devices, features, or functionality not discussed for purposes of brevity.

In some embodiments, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 may include general purpose central processing units, graphical processing units, application specific processors, and logic devices, as well as any other type of processing device, combinations, or variations thereof.

Storage system 1103 may comprise any memory device or computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including the policy tag process 1106 among other functions) may be implemented in program instructions that may, when executed by processing system 1102, direct processing system 1102 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing one or more functions of using a policy tag for SMF-PCF inconsistency detection/reconciliation or providing a policy tag. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a network function (NF) producer comprising: a non-transitory computer-readable medium; and one or more processors communicatively coupled to the non-transitory computer-readable medium and configured to execute processor-executable instructions stored in the non-transitory computer-readable medium to: establish a first state with an NF consumer, wherein the NF producer and the NF consumer are in a 5G network; generate a first policy tag corresponding to the first state, wherein the first policy tag comprises a first opaque identifier; store the first policy tag as a first stored policy tag; transmit a first communication to the NF consumer, wherein the first communication comprises first state data and the first policy tag; receive a communication from the NF consumer, wherein the communication comprises a first received policy tag; perform a validation process with the first received policy tag from the NF consumer; and process the communication based on the validation process of the first received policy tag.

Example 2 is the NF producer of any previous or subsequent Example, wherein: the processor-executable instructions to process the communication based on the validation process of the first received policy tag cause the one or more processors to further execute processor-executable instructions stored in the non-transitory computer-readable medium to establish a second state based on the communication; and the one or more processors are further configured to execute processor-executable instructions stored in the non-transitory computer-readable medium to: generate a second policy tag, wherein the second policy tag comprises a second opaque identifier; and transmit a second communication to the NF consumer, wherein the second communication comprises second state data and the second policy tag, wherein the first opaque identifier comprises a first site identifier and a first timestamp and the second opaque identifier comprises the first site identifier and a second timestamp.

Example 3 is the NF producer of any previous or subsequent Example, wherein the processor-executable instructions to perform the validation process of the first received policy tag cause the one or more processors to further execute processor-executable instructions stored in the non-transitory computer-readable medium to: retrieve the first stored policy tag; compare the first stored policy tag with the first received policy tag; and validate that the first stored policy tag matches the first received policy tag.

Example 4 is the NF producer of any previous or subsequent Example, wherein: the validation process indicates a mismatch between the first stored policy tag and the first received policy tag; and the processor-executable instructions to process the communication based on the validation process of the first received policy tag cause the one or more processors to further execute processor-executable instructions stored in the non-transitory computer-readable medium to: determine a state inconsistency between the NF producer and the NF consumer based on the mismatch; and initiate a reconciliation process between the NF producer and the NF consumer, wherein the reconciliation process comprises one of: terminate the first state; merge the first state with another state; re-synchronize states with the NF consumer; or rebuild the first state by fetching state data from one or more other NF producers.

Example 5 is the NF producer of any previous or subsequent Example, wherein the processor-executable instructions to process the communication based on the validation process of the first received policy tag cause the one or more processors to further execute processor-executable instructions stored in the non-transitory computer-readable medium to: determine a state inconsistency between the NF producer and the NF consumer; and initiate a reconciliation process between the NF producer and the NF consumer, wherein the reconciliation process comprises: determine a most recent update; and establish an updated state based on the most recent update.

Example 6 is the NF producer of any previous or subsequent Example, wherein the one or more processors are further configured to execute processor-executable instructions stored in the non-transitory computer-readable medium to: receive a communication that requires an update from the NF consumer; generate a second policy tag comprising a second opaque identifier; and transmit, to the NF consumer, a request for the update, wherein: the request for the update comprises the second policy tag; and the second opaque identifier is different than the first opaque identifier.

Example 7 is a method comprising: establishing, by a NF producer, a first state with an NF consumer, wherein the NF producer and the NF consumer are in a 5G network; generating, by a NF producer, a first policy tag corresponding to the first state, wherein the first policy tag comprises a first opaque identifier; storing, by the NF producer, the first policy tag as a first stored policy tag; transmitting, by the NF producer, a first communication to the NF consumer, wherein the first communication comprises first state data and the first policy tag; receiving, by the NF producer, a communication from the NF consumer, wherein the communication comprises a first received policy tag; performing, by the NF producer, a validation process with the first received policy tag from the NF consumer; and processing, by the NF producer, the communication based on the validation process of the first received policy tag.

Example 8 is the method of any previous or subsequent Example, wherein: the method further comprises receiving, from the NF consumer, a first request comprising request state data; and establishing, by the NF producer, the first state with the NF consumer further comprises: establishing, by the NF producer, the first state with the NF consumer responsive to receiving the first request, wherein the first state is established based on the request state data.

Example 9 is the method of any previous or subsequent Example, wherein: performing, by the NF producer, the validation process with the first received policy tag from the NF consumer comprises determining a match between the first stored policy tag and the first received policy tag; and processing, by the NF producer, the communication based on the validation process of the first received policy tag comprises establishing a second state, by the NF producer, based on the communication from the NF consumer responsive to determining the match.

Example 10 is the method of any previous or subsequent Example, wherein: processing, by the NF producer, the communication based on the validation process of the first received policy tag comprises establishing, by the NF producer, a second state; and the method further comprises: generating, by the NF producer, a second policy tag, wherein the second policy tag comprises a second opaque identifier; and transmitting, by the NF producer, a second communication to the NF consumer, wherein the second communication comprises second state data and the second policy tag.

Example 11 is the method of any previous or subsequent Example, wherein the first opaque identifier comprises a first site identifier and a first timestamp.

Example 12 is the method of any previous or subsequent Example, wherein: performing, by the NF producer, the validation process with the first received policy tag from the NF consumer comprises determining a mismatch between the first stored policy tag and the first received policy tag; and processing, by the NF producer, the communication based on the validation process of the first received policy tag comprises: determining, by the NF producer, a state inconsistency between the NF producer and the NF consumer; and initiating, by the NF producer, a reconciliation process between the NF producer and the NF consumer.

Example 13 is the method of any previous or subsequent Example, wherein: the NF producer is a Policy Control Function (PCF); and the NF consumer is a Session Management Function (SMF).

Example 14 is the method of any previous or subsequent Example, wherein the validation process indicates a mismatch between the first stored policy tag and the first received policy tag; and processing, by the NF producer, the communication based on the validation process of the first received policy tag comprises: determining, by the NF producer, a state inconsistency between the NF producer and the NF consumer based on the mismatch; and initiating, by the NF producer, a reconciliation process between the NF producer and the NF consumer, wherein the reconciliation process comprises one of: terminating the first state; merging the first state with another state; re-synchronizing states with the NF consumer; or rebuilding the first state by fetching state data from one or more other NF producers.

Example 15 is a non-transitory computer-readable medium comprising processor-executable instructions configured to cause one or more processors to: establish, with a NF consumer, a first state within a 5G network; generate a first policy tag corresponding to the first state, wherein the first policy tag comprises a first opaque identifier; store the first policy tag as a first stored policy tag; transmit a first communication to the NF consumer, wherein the first communication comprises first state data and the first policy tag; receive a communication from the NF consumer, wherein the communication comprises a first received policy tag;

perform a validation process with the first received policy tag from the NF consumer; and process the communication based on the validation process of the first received policy tag.

Example 16 is the non-transitory computer-readable medium of any previous or subsequent Example, wherein: the processor-executable instructions stored in the non-transitory computer-readable medium are further configured to cause the one or more processors to receive, from the NF consumer, a first request comprising request state data; and the processor-executable instructions to establish, with the NF consumer, the first state further cause the one or more processors to establish the first state with the NF consumer responsive to receiving the first request, wherein the first state is established based on the request state data.

Example 17 is the non-transitory computer-readable medium of any previous or subsequent Example, wherein the processor-executable instructions to perform the validation process with the first received policy tag from the NF consumer further cause the one or more processors to: retrieve the first stored policy tag; compare the first stored policy tag with the first received policy tag; and validate that the first stored policy tag matches the first received policy tag.

Example 18 is the non-transitory computer-readable medium of any previous or subsequent Example, wherein: the processor-executable instructions to process the communication based on the validation process of the first received policy tag further cause the one or more processors to establish a second state based on the communication; and the processor-executable instructions stored in the non-transitory computer-readable medium are further configured to cause the one or more processors to: generate a second policy tag, wherein the second policy tag comprises a second opaque identifier; and transmit a second communication to the NF consumer, wherein the second communication comprises second state data and the second policy tag.

Example 19 is the non-transitory computer-readable medium of any previous or subsequent Example, wherein the processor-executable instructions stored in the non-transitory computer-readable medium are further configured to cause the one or more processors to: receive a communication that requires an update communication from the NF consumer; generate a second policy tag comprising a second opaque identifier; and transmit, to the NF consumer, a request for the update communication, wherein: the request for the update communication comprises the second policy tag; and the second opaque identifier is different than the first opaque identifier.

Example 20 is the non-transitory computer-readable medium of any previous or subsequent Example, wherein: the NF consumer is selected from one of: a Policy Control Function (PCF); or a Session Management Function (SMF); and the first opaque identifier comprises a first site identifier and a first timestamp.

What is claimed is:

1. A network function (NF) producer comprising:
a non-transitory computer-readable medium; and
one or more processors communicatively coupled to the non-transitory computer-readable medium and configured to execute processor-executable instructions stored in the non-transitory computer-readable medium to:
establish a first state with an NF consumer, wherein the NF producer and the NF consumer are in a 5G network;
generate a first policy tag corresponding to the first state, wherein the first policy tag comprises a first opaque identifier;
store the first policy tag as a first stored policy tag;
transmit a first communication to the NF consumer, wherein the first communication comprises first state data and the first policy tag;
receive a communication from the NF consumer, wherein the communication comprises a first received policy tag;
perform a validation process with the first received policy tag from the NF consumer; and
process the communication based on the validation process of the first received policy tag.

2. The NF producer of claim 1, wherein:
the processor-executable instructions to process the communication based on the validation process of the first received policy tag cause the one or more processors to further execute processor-executable instructions stored in the non-transitory computer-readable medium to establish a second state based on the communication; and
the one or more processors are further configured to execute processor-executable instructions stored in the non-transitory computer-readable medium to:
generate a second policy tag, wherein the second policy tag comprises a second opaque identifier; and
transmit a second communication to the NF consumer, wherein the second communication comprises second state data and the second policy tag,
wherein the first opaque identifier comprises a first site identifier and a first timestamp and the second opaque identifier comprises the first site identifier and a second timestamp.

3. The NF producer of claim 1, wherein the processor-executable instructions to perform the validation process of the first received policy tag cause the one or more processors to further execute processor-executable instructions stored in the non-transitory computer-readable medium to:
retrieve the first stored policy tag;
compare the first stored policy tag with the first received policy tag; and
validate that the first stored policy tag matches the first received policy tag.

4. The NF producer of claim 1, wherein:
the validation process indicates a mismatch between the first stored policy tag and the first received policy tag; and
the processor-executable instructions to process the communication based on the validation process of the first received policy tag cause the one or more processors to further execute processor-executable instructions stored in the non-transitory computer-readable medium to:
determine a state inconsistency between the NF producer and the NF consumer based on the mismatch; and
initiate a reconciliation process between the NF producer and the NF consumer, wherein the reconciliation process comprises one of:
terminate the first state;
merge the first state with another state;
re-synchronize states with the NF consumer; or
rebuild the first state by fetching state data from one or more other NF producers.

5. The NF producer of claim 1, wherein the processor-executable instructions to process the communication based on the validation process of the first received policy tag cause the one or more processors to further execute processor-executable instructions stored in the non-transitory computer-readable medium to:
  determine a state inconsistency between the NF producer and the NF consumer; and
  initiate a reconciliation process between the NF producer and the NF consumer, wherein the reconciliation process comprises:
    determine a most recent update; and
    establish an updated state based on the most recent update.

6. The NF producer of claim 1, wherein the one or more processors are further configured to execute processor-executable instructions stored in the non-transitory computer-readable medium to:
  receive a communication that requires an update from the NF consumer;
  generate a second policy tag comprising a second opaque identifier; and
  transmit, to the NF consumer, a request for the update, wherein:
    the request for the update comprises the second policy tag; and
    the second opaque identifier is different than the first opaque identifier.

7. A method comprising:
  establishing, by a NF producer, a first state with an NF consumer, wherein the NF producer and the NF consumer are in a 5G network;
  generating, by a NF producer, a first policy tag corresponding to the first state, wherein the first policy tag comprises a first opaque identifier;
  storing, by the NF producer, the first policy tag as a first stored policy tag;
  transmitting, by the NF producer, a first communication to the NF consumer, wherein the first communication comprises first state data and the first policy tag;
  receiving, by the NF producer, a communication from the NF consumer, wherein the communication comprises a first received policy tag;
  performing, by the NF producer, a validation process with the first received policy tag from the NF consumer; and
  processing, by the NF producer, the communication based on the validation process of the first received policy tag.

8. The method of claim 7, wherein:
  the method further comprises receiving, from the NF consumer, a first request comprising request state data; and
  establishing, by the NF producer, the first state with the NF consumer further comprises:
    establishing, by the NF producer, the first state with the NF consumer responsive to receiving the first request, wherein the first state is established based on the request state data.

9. The method of claim 7, wherein:
  performing, by the NF producer, the validation process with the first received policy tag from the NF consumer comprises determining a match between the first stored policy tag and the first received policy tag; and
  processing, by the NF producer, the communication based on the validation process of the first received policy tag comprises establishing a second state, by the NF producer, based on the communication from the NF consumer responsive to determining the match.

10. The method of claim 7, wherein:
  processing, by the NF producer, the communication based on the validation process of the first received policy tag comprises establishing, by the NF producer, a second state; and
  the method further comprises:
    generating, by the NF producer, a second policy tag, wherein the second policy tag comprises a second opaque identifier; and
    transmitting, by the NF producer, a second communication to the NF consumer, wherein the second communication comprises second state data and the second policy tag.

11. The method of claim 7, wherein the first opaque identifier comprises a first site identifier and a first timestamp.

12. The method of claim 7, wherein:
  performing, by the NF producer, the validation process with the first received policy tag from the NF consumer comprises determining a mismatch between the first stored policy tag and the first received policy tag; and
  processing, by the NF producer, the communication based on the validation process of the first received policy tag comprises:
    determining, by the NF producer, a state inconsistency between the NF producer and the NF consumer; and
    initiating, by the NF producer, a reconciliation process between the NF producer and the NF consumer.

13. The method of claim 7, wherein:
  the NF producer is a Policy Control Function (PCF); and
  the NF consumer is a Session Management Function (SMF).

14. The method of claim 7, wherein the validation process indicates a mismatch between the first stored policy tag and the first received policy tag; and
  processing, by the NF producer, the communication based on the validation process of the first received policy tag comprises:
    determining, by the NF producer, a state inconsistency between the NF producer and the NF consumer based on the mismatch; and
    initiating, by the NF producer, a reconciliation process between the NF producer and the NF consumer, wherein the reconciliation process comprises one of:
      terminating the first state;
      merging the first state with another state;
      re-synchronizing states with the NF consumer; or
      rebuilding the first state by fetching state data from one or more other NF producers.

15. A non-transitory computer-readable medium comprising processor-executable instructions configured to cause one or more processors to:
  establish, with a NF consumer, a first state in a 5G network;
  generate a first policy tag corresponding to the first state, wherein the first policy tag comprises a first opaque identifier;
  store the first policy tag as a first stored policy tag;
  transmit a first communication to the NF consumer, wherein the first communication comprises first state data and the first policy tag;
  receive a communication from the NF consumer, wherein the communication comprises a first received policy tag;
  perform a validation process with the first received policy tag from the NF consumer; and
  process the communication based on the validation process of the first received policy tag.

16. The non-transitory computer-readable medium of claim 15, wherein:
the processor-executable instructions stored in the non-transitory computer-readable medium are further configured to cause the one or more processors to receive, from the NF consumer, a first request comprising request state data; and
the processor-executable instructions to establish, with the NF consumer, the first state further cause the one or more processors to establish the first state with the NF consumer responsive to receiving the first request, wherein the first state is established based on the request state data.

17. The non-transitory computer-readable medium of claim 15, wherein the processor-executable instructions to perform the validation process with the first received policy tag from the NF consumer further cause the one or more processors to:
retrieve the first stored policy tag;
compare the first stored policy tag with the first received policy tag; and
validate that the first stored policy tag matches the first received policy tag.

18. The non-transitory computer-readable medium of claim 15, wherein:
the processor-executable instructions to process the communication based on the validation process of the first received policy tag further cause the one or more processors to establish a second state based on the communication; and
the processor-executable instructions stored in the non-transitory computer-readable medium are further configured to cause the one or more processors to:
generate a second policy tag, wherein the second policy tag comprises a second opaque identifier; and
transmit a second communication to the NF consumer, wherein the second communication comprises second state data and the second policy tag.

19. The non-transitory computer-readable medium of claim 15, wherein the processor-executable instructions stored in the non-transitory computer-readable medium are further configured to cause the one or more processors to:
receive a communication that requires an update communication from the NF consumer;
generate a second policy tag comprising a second opaque identifier; and
transmit, to the NF consumer, a request for the update communication, wherein:
the request for the update communication comprises the second policy tag; and
the second opaque identifier is different than the first opaque identifier.

20. The non-transitory computer-readable medium of claim 15, wherein:
the NF consumer is selected from one of:
a Policy Control Function (PCF); or
a Session Management Function (SMF); and
the first opaque identifier comprises a first site identifier and a first timestamp.

* * * * *